(12) United States Patent
Frick et al.

(10) Patent No.: US 12,048,267 B2
(45) Date of Patent: Jul. 30, 2024

(54) HANDLE ASSEMBLY FOR AUTONOMOUS VEHICLE

(71) Applicant: THE TORO COMPANY, Bloomington, MN (US)

(72) Inventors: Alexander Steven Frick, Farmington, MN (US); Jason Thomas Kraft, Stillwater, MN (US); Aaron Yarrow Curtis, Eagan, MN (US); Kevin Dale Docken, Victoria, MN (US); Khari Sekou Clarke, Minneapolis, MN (US)

(73) Assignee: THE TORO COMPANY, Bloomington, MN (US)

( * ) Notice: Subject to any disclaimer, the term of this patent is extended or adjusted under 35 U.S.C. 154(b) by 750 days.

(21) Appl. No.: 17/261,406

(22) PCT Filed: Aug. 7, 2019

(86) PCT No.: PCT/US2019/045470
§ 371 (c)(1),
(2) Date: Jan. 19, 2021

(87) PCT Pub. No.: WO2020/033522
PCT Pub. Date: Feb. 13, 2020

(65) Prior Publication Data
US 2021/0251139 A1    Aug. 19, 2021

Related U.S. Application Data

(60) Provisional application No. 62/818,893, filed on Mar. 15, 2019, provisional application No. 62/741,988, (Continued)

(51) Int. Cl.
*A01D 34/00*    (2006.01)
*A01D 34/82*    (2006.01)
(Continued)

(52) U.S. Cl.
CPC ......... *A01D 34/008* (2013.01); *A01D 34/824* (2013.01); *G01C 21/3848* (2020.08);
(Continued)

(58) Field of Classification Search
CPC ...... A01D 34/008; A01D 34/69; A01D 34/78; A01D 34/824; A01D 2101/00;
(Continued)

(56) References Cited

U.S. PATENT DOCUMENTS

D158,847 S  *  6/1950  Flanigan ................. D15/16
2,727,753 A  * 12/1955  Johnson ............ A01D 34/824
                                                280/655
(Continued)

FOREIGN PATENT DOCUMENTS

AU    2020100154 A4  *  3/2020  ............ A01D 34/68
CA       3098462 A1  * 11/2019  ........... A01D 34/008
(Continued)

OTHER PUBLICATIONS

Examination Report No. 1 for AU2019317453, issued Aug. 18, 2023, 4 pages.
(Continued)

*Primary Examiner* — Arpad Fabian-Kovacs
(74) *Attorney, Agent, or Firm* — Mueting Raasch Group

(57) ABSTRACT

A handle assembly for an autonomous vehicle such as a lawn mower is provided and may include a cradle adapted to receive a mobile computer. The handle assembly may be configured in both an autonomous mode position and a manual mode position. The vehicle may operate autonomously when the handle assembly is in the autonomous mode position, and be adapted to move under manual operator control, e.g., for perimeter training, when the handle assembly is in the manual mode position.

13 Claims, 25 Drawing Sheets

Related U.S. Application Data filed on Oct. 5, 2018, provisional application No. 62/716,716, filed on Aug. 9, 2018, provisional application No. 62/716,208, filed on Aug. 8, 2018.

(51) Int. Cl.
| | |
|---|---|
| *G01C 21/00* | (2006.01) |
| *G05D 1/00* | (2006.01) |
| *G06V 10/46* | (2022.01) |
| *G06V 10/75* | (2022.01) |
| *G06V 20/10* | (2022.01) |
| *G06V 20/64* | (2022.01) |
| *A01D 34/69* | (2006.01) |
| *A01D 34/78* | (2006.01) |
| *A01D 101/00* | (2006.01) |

(52) U.S. Cl.
CPC ........ *G01C 21/3867* (2020.08); *G05D 1/0061* (2013.01); *G05D 1/0088* (2013.01); *G05D 1/0221* (2013.01); *G05D 1/0246* (2013.01); *G05D 1/027* (2013.01); *G05D 1/0274* (2013.01); *G06V 10/462* (2022.01); *G06V 10/757* (2022.01); *G06V 20/10* (2022.01); *G06V 20/64* (2022.01); *A01D 34/69* (2013.01); *A01D 34/78* (2013.01); *A01D 2101/00* (2013.01)

(58) Field of Classification Search
CPC ...... G06V 20/64; G06V 20/10; G06V 10/757; G06V 10/462; G05D 2201/0208; G05D 1/0274; G05D 1/027; G05D 1/0246; G05D 1/0221; G05D 1/0088; G05D 1/0061; G01C 21/3867; G01C 21/3848
See application file for complete search history.

(56) References Cited

U.S. PATENT DOCUMENTS

| | | | | |
|---|---|---|---|---|
| 3,357,716 | A * | 12/1967 | Musichuk | A01D 34/824 |
| | | | | 16/437 |
| 3,855,763 | A * | 12/1974 | Seifert | A01D 34/63 |
| | | | | 56/DIG. 18 |
| 5,209,051 | A * | 5/1993 | Langdon | A01D 34/82 |
| | | | | 56/DIG. 18 |
| 5,261,215 | A * | 11/1993 | Hartz | A01D 34/824 |
| | | | | 56/DIG. 18 |
| 5,394,965 | A | 3/1995 | Kho | |
| 5,606,851 | A | 3/1997 | Bruener et al. | |
| 6,158,089 | A * | 12/2000 | Monahan | B25G 1/04 |
| | | | | 16/431 |
| 6,301,746 | B1 | 10/2001 | Myers et al. | |
| 6,339,735 | B1 | 1/2002 | Peless et al. | |
| 7,097,181 | B2 | 8/2006 | Sadow | |
| 8,544,570 | B2 | 10/2013 | Ishii et al. | |
| 8,634,960 | B2 | 1/2014 | Sandin et al. | |
| 8,781,627 | B2 | 7/2014 | Sandin et al. | |
| 8,868,237 | B2 | 10/2014 | Sandin et al. | |
| 8,954,193 | B2 | 2/2015 | Sandin et al. | |
| 9,008,835 | B2 | 4/2015 | Dubrovsky et al. | |
| 9,043,952 | B2 | 6/2015 | Sandin et al. | |
| 9,043,953 | B2 | 6/2015 | Sandin et al. | |
| 9,241,441 | B2 | 1/2016 | Björn et al. | |
| 9,420,741 | B2 | 8/2016 | Balutis et al. | |
| 9,475,196 | B2 | 10/2016 | Jägenstedt et al. | |
| 9,516,806 | B2 | 12/2016 | Yamauchi et al. | |
| 9,538,702 | B2 | 1/2017 | Balutis et al. | |
| 9,554,508 | B2 | 1/2017 | Balutis et al. | |
| 9,826,678 | B2 | 11/2017 | Balutis et al. | |
| 9,855,490 | B2 * | 1/2018 | McGuffie | A01D 34/824 |
| 9,969,450 | B1 | 5/2018 | Lu et al. | |
| 10,390,483 | B2 | 8/2019 | Balutis et al. | |
| 10,849,267 | B2 | 12/2020 | Strandberg et al. | |
| 11,334,082 | B2 | 5/2022 | Frick et al. | |
| 2003/0144774 | A1 * | 7/2003 | Trissel | A01D 34/008 |
| | | | | 701/23 |
| 2008/0039974 | A1 | 2/2008 | Sandin et al. | |
| 2011/0302895 | A1 * | 12/2011 | Park | A01D 43/063 |
| | | | | 56/17.2 |
| 2013/0111866 | A1 * | 5/2013 | Schmalz | A01D 34/68 |
| | | | | 123/196 R |
| 2014/0102062 | A1 | 4/2014 | Sandin et al. | |
| 2014/0102064 | A1 * | 4/2014 | Yamaoka | A01D 69/08 |
| | | | | 56/10.5 |
| 2014/0121881 | A1 | 5/2014 | Diazdelcastillo | |
| 2015/0271991 | A1 | 10/2015 | Balutis et al. | |
| 2015/0316913 | A1 | 11/2015 | Rickey et al. | |
| 2016/0165795 | A1 * | 6/2016 | Balutis | G01S 19/13 |
| | | | | 701/25 |
| 2016/0174459 | A1 | 6/2016 | Balutis et al. | |
| 2016/0198627 | A1 * | 7/2016 | Wadzinski | A01D 34/001 |
| | | | | 56/320.1 |
| 2017/0364090 | A1 | 12/2017 | Grufman et al. | |
| 2018/0168097 | A1 | 6/2018 | Yamauchi et al. | |
| 2018/0352731 | A1 | 12/2018 | Hans et al. | |
| 2019/0307066 | A1 | 10/2019 | Jiang | |
| 2019/0369620 | A1 | 12/2019 | Zhou et al. | |
| 2020/0000030 | A1 * | 1/2020 | Wei | A01D 75/18 |
| 2022/0117155 | A1 * | 4/2022 | Kippes | A01D 34/006 |

FOREIGN PATENT DOCUMENTS

| | | | | |
|---|---|---|---|---|
| CN | 102523817 | A * | 7/2012 | ........... A01D 34/824 |
| CN | 104025798 | A | 9/2014 | |
| CN | 203872585 | U | 10/2014 | |
| CN | 205865175 | U | 1/2017 | |
| CN | 106535614 | A | 3/2017 | |
| CN | 207201326 | U | 4/2018 | |
| CN | 110249778 | A * | 9/2019 | ............. A01D 34/82 |
| CN | 111034471 | A * | 4/2020 | ............. A01D 34/00 |
| DE | 202012101866 | U1 | 7/2012 | |
| EP | 2774470 | A1 * | 9/2014 | ............. A01D 34/67 |
| EP | 2873587 | | 8/2016 | |
| EP | 3067771 | | 9/2016 | |
| EP | 3175693 | | 6/2017 | |
| EP | 3245894 | A1 | 11/2017 | |
| EP | 3412128 | A1 | 12/2018 | |
| GB | 2481106 | A * | 12/2011 | ............. A01D 34/00 |
| JP | H0556899 | A | 3/1993 | |
| JP | 5792361 | B1 | 10/2015 | |
| WO | 2007/109624 | | 9/2007 | |
| WO | WO-2013002773 | A1 * | 1/2013 | ............. A01D 34/64 |
| WO | 2015/040987 | A1 | 3/2015 | |
| WO | 2016/099616 | | 6/2016 | |
| WO | 2017/004517 | | 1/2017 | |
| WO | 2017215604 | A1 | 12/2017 | |
| WO | 2018001358 | A1 | 1/2018 | |
| WO | 2018108178 | A1 | 6/2018 | |
| WO | 2020-033504 | | 2/2020 | |
| WO | 2020-033522 | | 2/2020 | |

OTHER PUBLICATIONS

Examination Report No. 2 for AU2019317453, issued Sep. 4, 2023, 6 pages.
Response to Notice of Opposition to European Patent No. 3833177, dated Sep. 8, 2023, 33 pages.
European Search Report mailed in connection with EP Application No. 22178944.9, Sep. 23, 2022; 9 pages.
Ackerman, "iRobot Finally Announces Awesome New Terra Robotic Lawnmower" Jan. 30, 2019 IEEE Spectrum; 7 pages.
U.S. Appl. No. 62/741,988, filed Oct. 5, 2018; Frick et al.
U.S. Appl. No. 62/716,208, filed Aug. 8, 2018; Frick et al.
U.S. Appl. No. 62/716,716, filed Aug. 9, 2018; Frick et al.
U.S. Appl. No. 62/818,893, filed Mar. 15, 2019; Frick et al.
WO Patent Application No. PCT/US2019/045470, filed Aug. 7, 2019; Invitation to Pay Additional Fees, and, Where Applicable, Protest Fee issued Nov. 15, 2019, 11 pages.

(56) References Cited

OTHER PUBLICATIONS

WO Patent Application No. PCT/US2019/045470, filed Aug. 7, 2019; International Search Report and Written Opinion issued Feb. 14, 2020; 19 pages.
WO Patent Application No. PCT/US2019/045470, filed Aug. 7, 2019; Invitation to Restrict or Pay Additional Fees, and, Where Applicable, Protest Fee issued Jun. 26, 2020; 2 pages.
WO Patent Application No. PCT/US2019/045470, filed Aug. 7, 2019; Written Opinion of the International Preliminary Examining Authority issued Oct. 1, 2020; 9 pages.
WO Patent Application No. PCT/US2019/045470, filed Aug. 7, 2019; International Preliminary Report on Patentability issued Nov. 19, 2020; 19 pages.
Notice of Opposition for EP3833177, issued May 10, 2023, 100 pages.

* cited by examiner

HANDLE ASSEMBLY FOR AUTONOMOUS VEHICLE

The present application is a 35 U.S.C. § 371 U.S. National Stage application of International Application No. PCT/US2019/045470, filed Aug. 7, 2019, which claims priority to and/or the benefit of U.S. Provisional Patent Application Numbers: 62/818,893, filed Mar. 15, 2019; 62/741,988, filed Oct. 5, 2018; 62/716,716, filed Aug. 9, 2018; and 62/716,208, filed Aug. 8, 2018, all of which are incorporated herein by reference in their respective entireties.

The present disclosure relates to autonomous vehicles (e.g., lawn mowers) and, more particularly, to stowable handles suitable for deployment during a training or manual mode of operation of the vehicle, and to systems and methods for storing the vehicle, and for training the vehicle to recognize a property or boundary thereof.

BACKGROUND

Lawn and garden vehicles are known for performing a variety of tasks. For instance, powered lawn mowers are used by both homeowners and professionals alike to maintain turf areas within a property or yard.

Robotic mowers that autonomously perform a grass cutting function are also known. Autonomous mowers typically include a cutter housing having a cutting member or blade. A battery-powered electric motor is generally included to power both the cutting blade as well as a propulsion system. Depending on the property size, the mower may cut only a portion of the property before returning to a base station for battery re-charging.

Autonomous mowers typically cut grass in a random travel pattern within the property boundary. Some autonomous mowers define the property boundary by a continuous boundary marker, e.g., an energized wire laying on, or buried beneath, the lawn. Such boundary wires may also extend into the interior of the yard to demarcate obstacles (e.g., trees, flower beds, etc.) or other excluded areas. The mower may then move randomly within the areas delineated by the boundary wire.

While effective, installing boundary wire is perceived as a time-consuming process, especially for larger yards or those with intricate borders. Moreover, after installation, boundary wires may be inadvertently damaged, especially when the wire is laid upon, rather than beneath, the ground surface. Still further, a secondary device (manual lawn mower or string trimmer) may be needed to mow areas of the property inaccessible to the autonomous mower.

SUMMARY

Embodiments described herein may provide, among other benefits, handle systems and methods for autonomous vehicles that permit handle usage when the vehicle is in a manual mode of operation (e.g., for manual mower operation/transport or for perimeter training), and onboard handle storage when the vehicle is in an autonomous mode of operation.

In one embodiment, an autonomous vehicle is provided that includes: a housing comprising a working member; and a handle assembly connected to the housing, wherein the handle assembly is movable between a first position and a second position. The vehicle is operable to perform a work function autonomously when the handle assembly is in the first position and move under manual (e.g., operator) control when the handle assembly is in the second position. The handle assembly is adapted to move from the first position to the second position by telescopically collapsing.

In another embodiment, an autonomous mower is provided that includes: a housing; a cutting blade assembly carried by the housing; a handle assembly connected to the housing, the handle assembly moveable between a first or autonomous mode position and a second or manual mode position; a sensor adapted to both: detect when the handle assembly is moved away from the first position; and generate a signal representative thereof; and a controller associated with the housing, wherein the controller, upon receipt of the signal, automatically disables an autonomous mode of operation of the mower.

In still another embodiment, an autonomous mower is provided that includes: a housing; a cutting blade assembly carried by the housing and operable to cut grass; a handle assembly connected to the housing, the handle assembly moveable between a first or autonomous mode position and a second or manual mode position; a cradle attached to the handle assembly, the cradle adapted to hold a mobile computer in an orientation visible to an operator standing behind the housing; and a controller associated with the housing, wherein the controller is adapted to communicate with the mobile computer during a training phase of the mower.

In still yet another embodiment, a method of training an autonomous vehicle to operate within a work region is provided, wherein the method includes: deploying a handle assembly connected to a housing of the vehicle from a first or autonomous mode position to a second or manual mode position; placing a mobile computer on a cradle attached to the handle assembly; initiating communication between the mobile computer and an electronic controller associated with the vehicle; selecting a boundary training phase of the vehicle via interaction with the mobile computer; traversing a boundary of the work region; collecting data associated with the boundary as the vehicle traverses the boundary of the work region; generating, with the controller, the mobile computer, or a remote computer a mapped boundary path based upon the data associated with the boundary; and indicating, on the mobile computer, whether the mapped boundary path satisfies path criteria.

In yet another embodiment, a method of training an autonomous vehicle to operate within a work region is provided, wherein the method includes: deploying a handle assembly connected to a housing of the vehicle from an autonomous mode position to a manual mode position; placing a mobile computer on a cradle attached to the handle assembly; initiating communication between the mobile computer and a controller associated with vehicle; initiating a transit path training phase of the vehicle via application software operating on the mobile computer; traversing a transit path across a portion of the work region; and collecting data associated with the transit path as the vehicle traverses the transit path.

In still yet another embodiment, a mower system is provided, wherein the system includes a mower and a base station, the base station adapted to receive the mower when the mower is in a horizontal orientation during periods of inactivity of the mower. The mower and base station are adapted to be secured to one another to form a storage assembly, wherein the storage assembly comprises a hanging structure that permits the mower and base station together to be hung in a vertical orientation for storage.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

Figure 1:
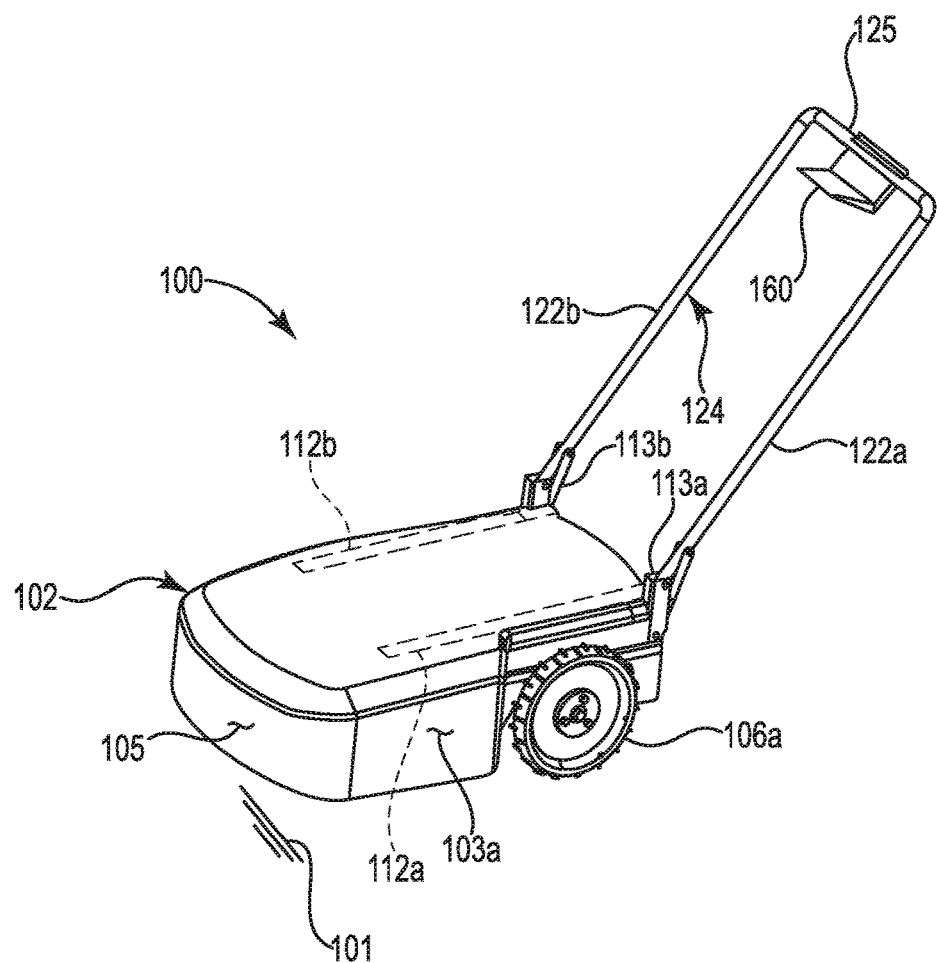
FIG. 1 is a perspective view of an autonomous vehicle, e.g., autonomous lawn mower, in accordance with embodiments of the present disclosure, the mower shown configured in a manual mode, wherein a handle assembly of the mower is positioned in a corresponding manual mode position.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about." Further, the term "and/or" (if used) means one or all of the listed elements or a combination of any two or more of the listed elements. Still further, "i.e." may be used herein as an abbreviation for the Latin phrase id est and means "that is," while "e.g." may be used as an abbreviation for the Latin phrase exempli gratia and means "for example."

Embodiments of the present disclosure are directed to autonomous vehicles having a working member or tool, and to methods of operating the same within a predefined work region. Such vehicles may operate in an autonomous mode wherein a work function (e.g., cutting grass) is performed autonomously. Exemplary vehicles as described herein may also operate in a manual mode suitable for, among other purposes, boundary or perimeter training of the vehicle by manually guiding the vehicle along boundaries of the work region.

One exemplary vehicle may be configured as an autonomous lawn mower adapted to cut grass as the mower travels over the work region. In the autonomous mode, mowers in accordance with embodiments of the present disclosure may perform the work function with little or no involvement from an operator. Again, however, such mowers may also be selectively configured in a manual mode. While the manual mode provides other benefits, it may provide a handle that is particularly useful for allowing the operator to manually guide the mower along boundaries (or designated paths) of the work region so that the mower may "learn" the boundary location (e.g., via odometry, vision sensors, geo-positioning, beacon location, etc.).

As used herein, "work region" may include an area bounded by a perimeter within which the mower will operate. The work region includes mowing areas (areas that will be mowed during operation), and, optionally, exclusion zones. "Exclusion zones" or areas are zones contained within the work region in which the mower will not operate (e.g., sidewalks, driveways, gardens, etc.). Embodiments of the present disclosure are suitable for training not only the work region perimeter, but also the boundaries of these exclusion zones, as well as transit paths across exclusion zones where needed.

In addition to using the handle for training of the mower, the manual mode of the mower may also be used for manual mowing tasks. For example, the handle could be deployed when the operator wishes to perform the work function (mowing) under direct control (e.g., when the operator wishes to operate the mower as a conventional walk power mower). Notwithstanding the ability of the mower to mow when in the manual mode, the manual mode will generally be described herein in the context of a training phase of the mower.

Accordingly, embodiments of the present disclosure may provide a handle or handle assembly moveable between an autonomous mode position and a manual mode position corresponding to the autonomous and manual (e.g., training) modes, respectively, of the mower. As used herein, the term "movable" may refer to handles that are permanently attached to the mower and movable between the autonomous mode position and the manual mode position, as well as to handles that are attached to the mower in the manual mode position yet detached from the mower in the autonomous mode position.

While described herein as an autonomous mower, such a configuration is exemplary only as systems and methods described herein also have application to other autonomously operated vehicles having most any working member including, for example, commercial turf products, other ground working vehicles (e.g., debris blowers/vacuums, aerators, material spreaders, snow throwers), as well as indoor working vehicles such as vacuums and floor scrubbers/cleaners. In fact, aspects of the present disclosure may find application to most any autonomous vehicle that utilizes a working member to perform a work function.

It is noted that the terms "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the particular figure, or while the vehicle (e.g., mower 100) is operating upon a ground surface 101 as shown in FIG. 1. These terms are used only to simplify the description, however, and not to limit the interpretation of any embodiment described.

Still further, reference numeral suffixes "a" and "b" may, where beneficial, be used to denote various left- and right-side parts/features, respectively. However, in most pertinent respects, the parts/features denoted with "a" and "b" suffixes are substantially identical to, or mirror images of, one another. It is understood that, unless otherwise noted, the description or identification of an individual part/feature (e.g., part/feature identified with an "a" suffix) also applies to the opposing part/feature (e.g., part/feature identified with a "b" suffix). Similarly, the description or identification of a part/feature identified with no suffix may apply, unless noted otherwise, to both the corresponding left- and right-side part/feature.

Figure 2:
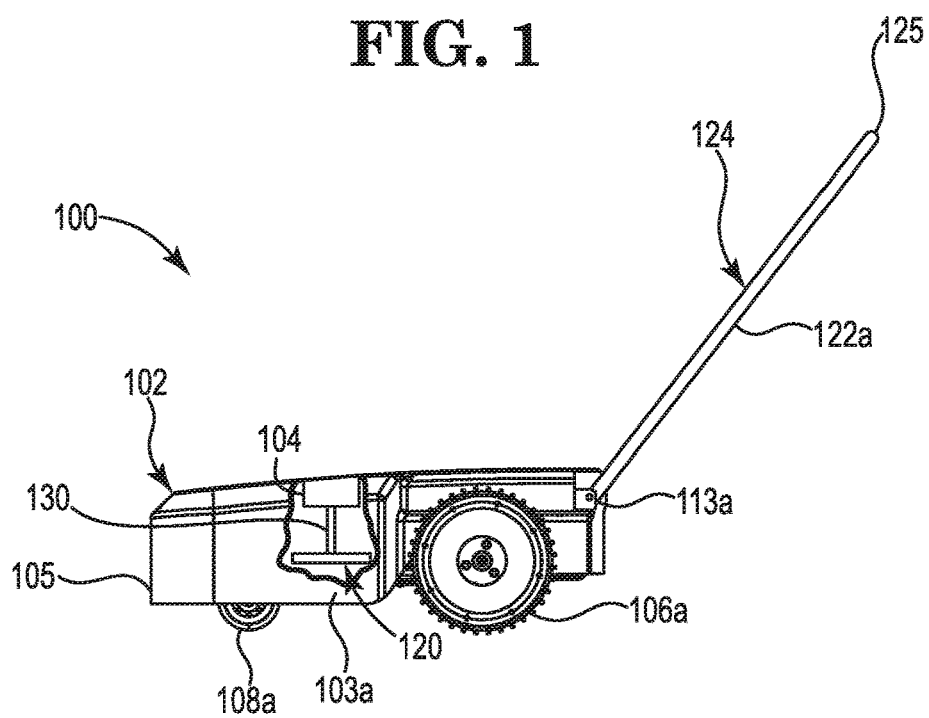
FIG. 2 is a partial cut-away side elevation view of the autonomous mower of FIG. 1 (again shown in the manual mode)

FIGS. 1 and 2 provide a perspective view and cut-away side elevation view, respectively, of an exemplary autonomous vehicle, e.g., autonomous lawn mower 100, configured in a manual mode (e.g., for manual operation and/or a training phase) in accordance with embodiments of the present disclosure. As shown in these views, the mower 100 may include a housing 102 ("housing" is used herein to collectively refer to both a chassis or frame of the mower, as well as a perimeter bump shroud movably attached to the chassis) and an associated working member carried by the housing (e.g., cutting blade assembly 120; shown diagrammatically in FIG. 2, but see FIG. 3), the housing supported in rolling engagement upon the ground surface 101 by a plurality of ground-engaging members. For example, rear wheels 106 (e.g., rear wheels 106a and 106b (see FIG. 3)) and front wheels 108 (e.g., front wheel 108a and 108b (see also FIG. 3)) may be attached, respectively, at or near the rear and front sides, respectively, of the housing as shown. The wheels may rotate, relative to the housing 102, as the housing moves over the ground surface 101. Some of the wheels (e.g., the rear wheels 106) may be powered to propel the mower during operation. For example, the rear wheels 106 may be independently driven in forward and reverse directions, while the front wheels may passively caster.

Figure 3:
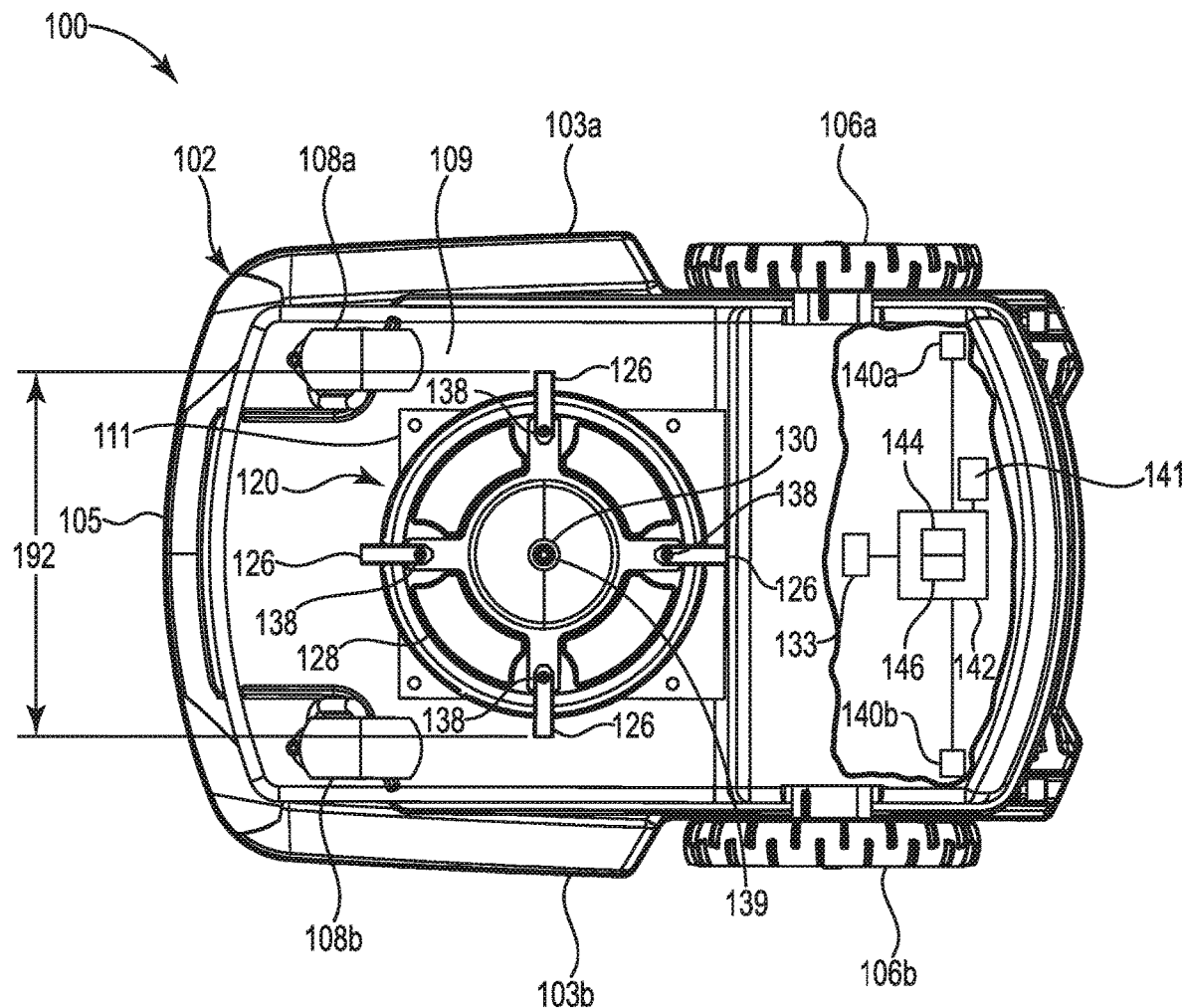
FIG. 3 is a diagrammatic bottom plan view of an exemplary autonomous mower like that of FIG. 1 (handle assembly not shown in this view)

In the illustrated embodiments, the housing 102 may define a cutting deck supporting a working member configured as a cutting blade assembly 120 as further described below and shown in FIG. 3. The housing may include an upper chamber wall 111 (see FIG. 3) and downwardly extending sidewalls (e.g., left and right sidewalls 103a, 103b, and front sidewall 105) forming a partially enclosed, downwardly opening cutting chamber 109. While described as forming a "chamber," the cutting blade assembly 120 may operate regardless of the housing shape, e.g., the blade assembly may operate without the benefit of any volute shape that may be typical with conventional rotary mowers. In some embodiments, some or all of the sidewalls may be formed by a perimeter bump shroud that may be used to detect contact with obstacles. The transverse outer edges of the left and right sidewalls 103 may extend outwardly to or beyond the rear wheel track width as indicated in FIG. 3.

The mower 100 may also include a prime mover, e.g., electric motor 104 (see FIG. 2), that in one embodiment, is attached to the upper chamber wall 111 of the housing. While illustrated herein as an electric motor 104, alternative prime movers, such as internal combustion engines, are also contemplated. Other components, e.g., battery 133 (see FIG. 3), may also be attached to (e.g., enclosed within a compartment of) the housing 102.

The motor 104 may include an output shaft 130 that extends vertically downward (in FIG. 2) through the upper chamber wall 111 of the housing 102 and into the cutting chamber 109. The cutting blade assembly 120 may be attached to an end of the shaft 130 within the cutting chamber 109. As illustrated in FIG. 3, the cutting blade assembly 120 may include a plurality of cutting blades 126 (e.g., four cutting blades) attached to a disk 128. In some embodiments, each of the cutting blades 126 may be pivotally attached to the disk 128 by a pin or fastener 138. The disk 128 may be attached, directly or indirectly, to the output shaft 130, by a fastener 139.

During operation, the output shaft 130 rotates the cutting blade assembly 120 at a speed sufficient to permit the blades 126 to cut grass and other vegetation over which the housing 102 passes. By pivotally connecting each cutting blade 126 to the rotating disk 128, the cutting blades are capable of incurring blade strikes against various objects (e.g., rocks, tree roots, etc.) without causing excessive damage to the blades 126, blade assembly 120, shaft 130, or motor 104. Moreover, while described herein in the context of one or more cutting "blades," other cutting elements including, for example, conventional mower blades, string or line elements, etc., are certainly possible without departing from the scope of this disclosure.

Once again, the sidewalls 103, 105 do not necessarily define walls that interact with the cutting blade assembly 120 in a manner similar to a conventional walk power mower (e.g., the cutting width of the blade assembly 120 may be significantly less that the width of the housing 102). Rather, the sidewalls/bump shroud are primarily intended to prevent contact of the spinning blades with obstacles.

As stated above, the wheels 106 are powered at least during autonomous operation (e.g., by the motor 104 or separate wheel motors (not shown)) so that the mower 100 is self-propelled. While shown having four wheels, other embodiments may utilize any number of wheels. Still further, as used herein, "wheels" may include other ground-engaging members such as tracks, rollers, or skids.

The mower 100 may include a controller 142 (see FIG. 3) adapted to monitor and control various mower functions including, for example, the selection of an autonomous mode or a manual mode of the mower 100. In some embodiments, the mower 100/controller 142 may detect a position of a handle or handle assembly 124 (see FIG. 1) connected to the housing 102. That is to say, the controller 142 may receive handle position data and, in response, control whether the mower 100 operates in the autonomous mode or the manual mode. "Handle assembly and "handle" are used herein to refer to both a unitary (e.g., single piece) handle construction as well as an assembly of components that together form a handle. These terms may be used interchangeably herein without limitation.

The exemplary controller 142 may include a processor 144 and memory 146, where the processor 144 receives various inputs and executes one or more computer programs or applications stored in the memory 146. The memory 146 may include computer-readable instructions or applications that, when executed, e.g., by the processor 144, cause the controller 142 to perform various calculations and/or issue various commands. That is to say, the processor 144 and memory 146 may together define a computing apparatus operable to process input data and generate the desired output to one or more components/devices.

The handle assembly 124 may, in some embodiments, be movable or otherwise configurable, relative to the housing 102, between a first position (also referred to herein as the autonomous mode position) and a second position (also referred to herein as a manual mode position). As described herein, the mower 100 may be adapted to perform its work function (i.e., cutting grass) autonomously when the handle assembly is in the first position, and perform the work function (or operate in a training phase with or without blade assembly operation) under manual control when the handle assembly is in the second position.

As stated above, the controller 142 may, in some embodiments, detect when the handle assembly 124 is in either or both of the first position and the second position. For example, movement of the handle assembly 124 to the manual mode position (see FIG. 1, wherein the handle assembly extends outwardly (e.g., rearwardly and upwardly) from the housing in a manner similar to a conventional mower)—or otherwise moved away from the autonomous mode position—may be detected by sensors or switches 140 (140a and 140b; see FIG. 3) that then generate or provide a signal representative thereof to the controller 142. The controller 142 may then, upon receipt of the signal, permit operation (e.g., collection of training information and/or operation of the motor 104/cutting blade assembly 120) in the manual mode. That is to say, the controller 142 may automatically disable the autonomous mode of operation of the mower when the handle assembly is in the manual mode position or is otherwise not in the autonomous mode position. Moreover, the controller 142 may be adapted to permit initiation of the training phase only when the handle assembly is in the manual mode position. Once again, the manual mode position of the handle assembly 124 may also be beneficial to manual mowing operation and non-operational transport of the mower 100 (e.g., transport of the mower to a storage location and/or manually pushing the mower when the battery is drained).

Movement of the handle assembly 124 to the autonomous mode position (see, e.g., FIG. 5), on the other hand, may also be detected by the same (or different) sensors or switches 140, and a corresponding signal provided to the controller 142. That is to say, moving the handle assembly 124 to the autonomous mode position (see FIG. 5) may be a prerequisite to enable the autonomous mode of operation of the mower.

Figure 4:
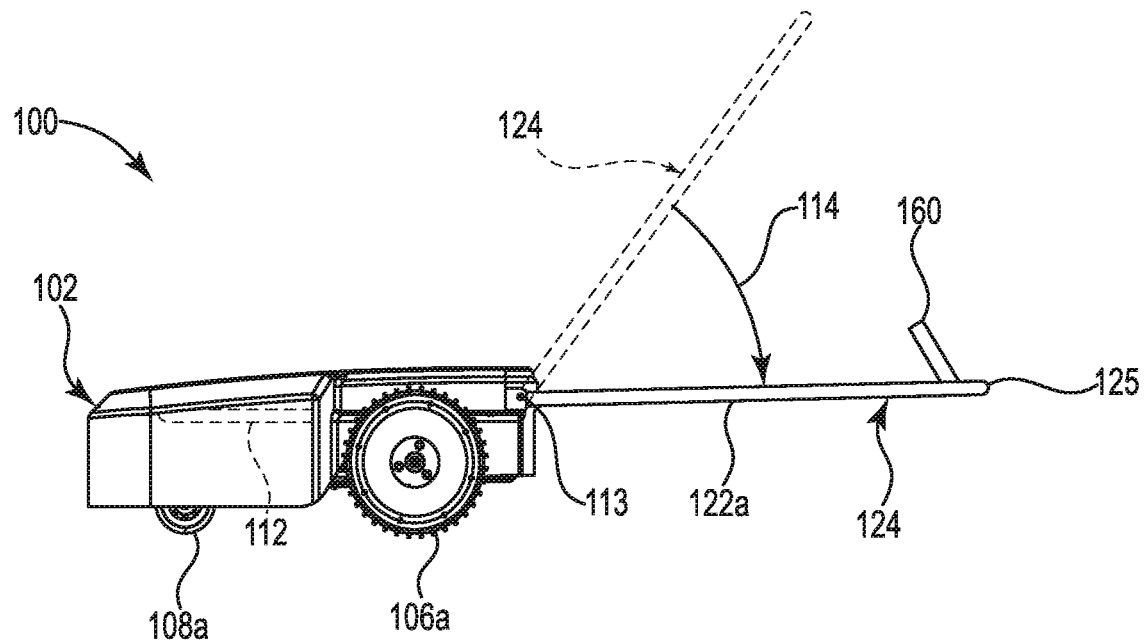
FIG. 4 is a side elevation view of the autonomous mower of FIG. 1 during transition from the manual mode to an autonomous mode.
Figure 5:
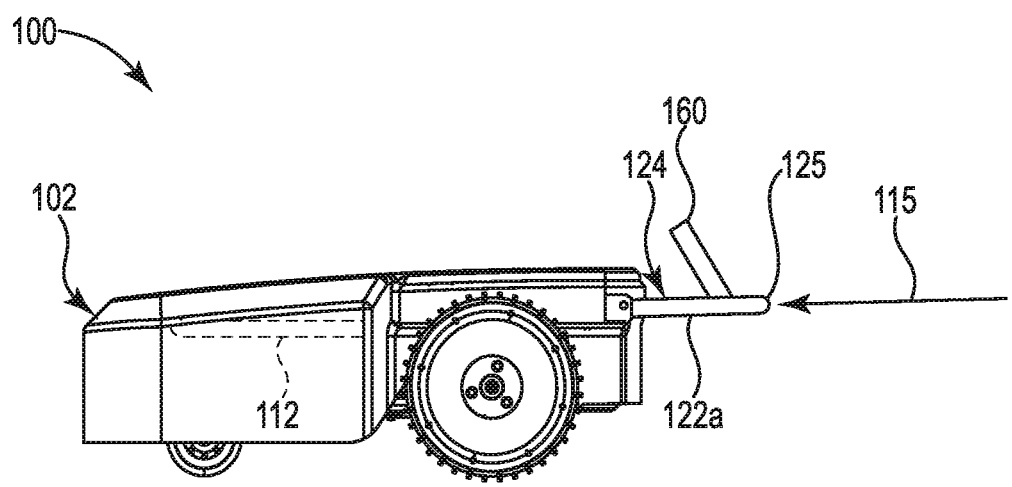
FIG. 5 illustrates the mower of FIG. 4 in the autonomous mode (with the handle assembly shown in a corresponding autonomous mode position)

The handle assembly 124 is shown in the manual mode position in FIGS. 1 and 2, while FIG. 4 illustrates an intermediate or transitioning position of the handle assembly to the autonomous mode position shown in FIG. 5. Once again, while illustrated as moving between its two positions via collapsing into or onto the housing 102, such a configuration is exemplary as embodiments wherein the handle assembly completely detaches from the housing 102 when in the autonomous mode position are also contemplated.

During operation in either the manual or autonomous mode, the processor 144 may receive various input data including, for example, positional data from a global positioning system (GPS) receiver (not shown). In other embodiments, one or more of the wheels 106, 108 may include encoders (also not shown) that provide wheel rotation/speed (e.g., odometry) information that may be used to estimate mower position (e.g., based upon an initial start position) within a given work region. Other sensors (e.g., infrared, radio detection and ranging (radar), light detection and ranging (lidar), etc.) now known or later developed may also be incorporated into the mower 100. The mower 100 may optionally include sensors adapted to detect a boundary wire if such detection is needed. Still further, the housing may include a radio 141 (see FIG. 3) or other communication device adapted to permit wireless communication with wide area networks (e.g., cellular data networks), local area networks (e.g., residential wireless networks), and/or personal area networks (e.g., short-range networks such as those utilizing "Bluetooth" communication protocols).

In the autonomous mode, the controller 142 may generate speed and steering angle commands to drive wheel motor(s) (not shown), which cause the drive wheels 106 to rotate (at the same or different speeds and in the same or different directions). In other words, the controller 142 may control the steering angle and speed of the mower 100, as well as the speed and operation of the cutting blade assembly 120, during autonomous mode operation.

The functionality of the controller 142 may be implemented in any manner known to one skilled in the art. For instance, the memory 146 may include any volatile, non-volatile, magnetic, optical, and/or electrical media, such as a random-access memory (RAM), read-only memory (ROM), non-volatile RAM (NVRAM), electrically-erasable programmable ROM (EEPROM), flash memory, and/or any other digital media. While shown as both being incorporated into the controller 142, the memory 146, and the processor 144 could be contained in separate modules.

The processor 144 may include any one or more of a microprocessor, a controller, a digital signal processor (DSP), an application specific integrated circuit (ASIC), a field-programmable gate array (FPGA), and/or equivalent discrete or integrated logic circuitry. In some embodiments, the processor 144 may include multiple components, such as any combination of one or more microprocessors, one or more controllers, one or more DSPs, one or more ASICs, and/or one or more FPGAs, as well as other discrete or integrated logic circuitry. The functions attributed to the controller/processor herein may be embodied as software, firmware, hardware, or any combination thereof. In at least one embodiment, various subsystems of the mower 100, as described above, could be connected in most any manner, e.g., directly to one another, wirelessly, via a bus architecture (e.g., controller area network (CAN) bus), or any other connection configuration that permits data and/or power to pass between the various components of the mower.

The following description may be organized by headings and/or subheadings for presentation only. The particular headings/subheadings are not intended to limit in any way the embodiments described therein, i.e., alternative embodiments may be found elsewhere in the specification, and the specification is to be viewed as a whole.

Handle Assembly

The autonomous mower 100 may also include an operator handle assembly connected to the housing, embodiments of which are as shown in FIGS. 1, 2, and 4 through 24. In some embodiments, exemplary handle assemblies 124 (see FIGS. 1, 2, and 4) may be formed by at least one handle member or tube 122 that attaches to the housing 102. For example, the handle assembly 124 may be formed by spaced-apart left and right handle tubes 122a, 122b as shown in FIG. 1. The tubes 122 may pivotally attach to the housing 102 at their respective proximal ends and be joined near their distal ends by a cross member forming a transverse grip area 125. Accordingly, the handle assembly 124 may form a generally U-shaped structure. In other embodiments, the handle assembly 124 could utilize a single handle tube or member, where the grip area is formed by transversely extending portions (e.g., a T-shaped handle assembly). Regardless of the particular handle assembly construction, the handle assembly 124 may be movable or otherwise reconfigurable between a first (autonomous mode) position (see, e.g., FIGS. 5, 8, 11, 12, 13, 14, and 24), and a second (manual mode) position (see, e.g., FIGS. 1, 2 and 15).

As stated above and illustrated diagrammatically in FIG. 3, the mower 100 may, in some embodiments, include one or more switches or sensors 140 that, along with the controller 142, assist in detecting the position of the handle assembly 124 (or assembly 724 described below), e.g., whether the handle assembly is in the autonomous mode position and/or in the manual mode position. While FIG. 3 illustrates a switch/sensor associate with each side (e.g., sensor 140a for tube 122a and sensor 140b for tube 122b), other embodiments may utilize a single sensor.

In response to detecting that the handle assembly 124/tubes 122 are in the manual mode position of FIGS. 1-2, the controller 142 may disable or prevent autonomous mode functionality and instead permit operation of the mower 100 in the manual mode, which may be required during a training phase as further described below. Likewise, in response to detecting, among other things, that the handle assembly 124/tubes 122 are in the autonomous mode position (see, e.g., FIG. 5), the controller may permit autonomous mode functionality (e.g., execute autonomous mowing algorithms associated with the autonomous mode), assuming other requirements are also satisfied.

Accordingly, the sensors/switches 140 may function as interlocks to ensure that the mower 100 operates in the autonomous mode only when the handle assembly is in the autonomous mode position, and in the manual mode when the handle assembly is not in the autonomous mode position (e.g., is in the manual mode position). As a result, during transition of the handle assembly from the manual mode position to the autonomous mode position (and vice versa), the motor 104 (and other motors/systems) may, in some embodiments, be disabled by the controller 142.

These handle assembly position detection features may be optional. That is, mowers wherein the controller 142 is unaware of the handle assembly position are also contemplated within the scope of this disclosure.

As illustrated in FIG. 1, when in the manual mode position, the handle assembly 124 may extend generally rearwardly and upwardly from the housing 102 in a manner similar to a conventional (non-autonomous) walk power mower. The grip areas 125 may be spaced apart from the housing 102 when the handle assembly 124 is in the manual mode position to ensure that the operator, when gripping the grip area 125 of the handle assembly 124, is located at a predetermined distance from the housing 102.

As stated above, the autonomous mode position and the manual mode position of the handle assembly 124 may correspond to the two modes of operation of the mower 100.

Advantageously, the ability to reconfigure the mower 100 between the autonomous and manual modes allows the mower 100 to operate autonomously while mowing a majority of the work region, and then operate manually to address those areas that may be inaccessible during autonomous operation. Moreover, manual mode position of the handle assembly 124 may also be used for training the mower as further described below.

The handle assembly 124 may include various controls (not shown) for controlling mower operation when in the manual mode. For instance, controls (e.g., bails, buttons, levers, etc. (not shown)) for controlling propulsion, operator presence detection, blade engagement, etc., may be provided near the grip area 125 of the handle assembly 124.

Figure 27:
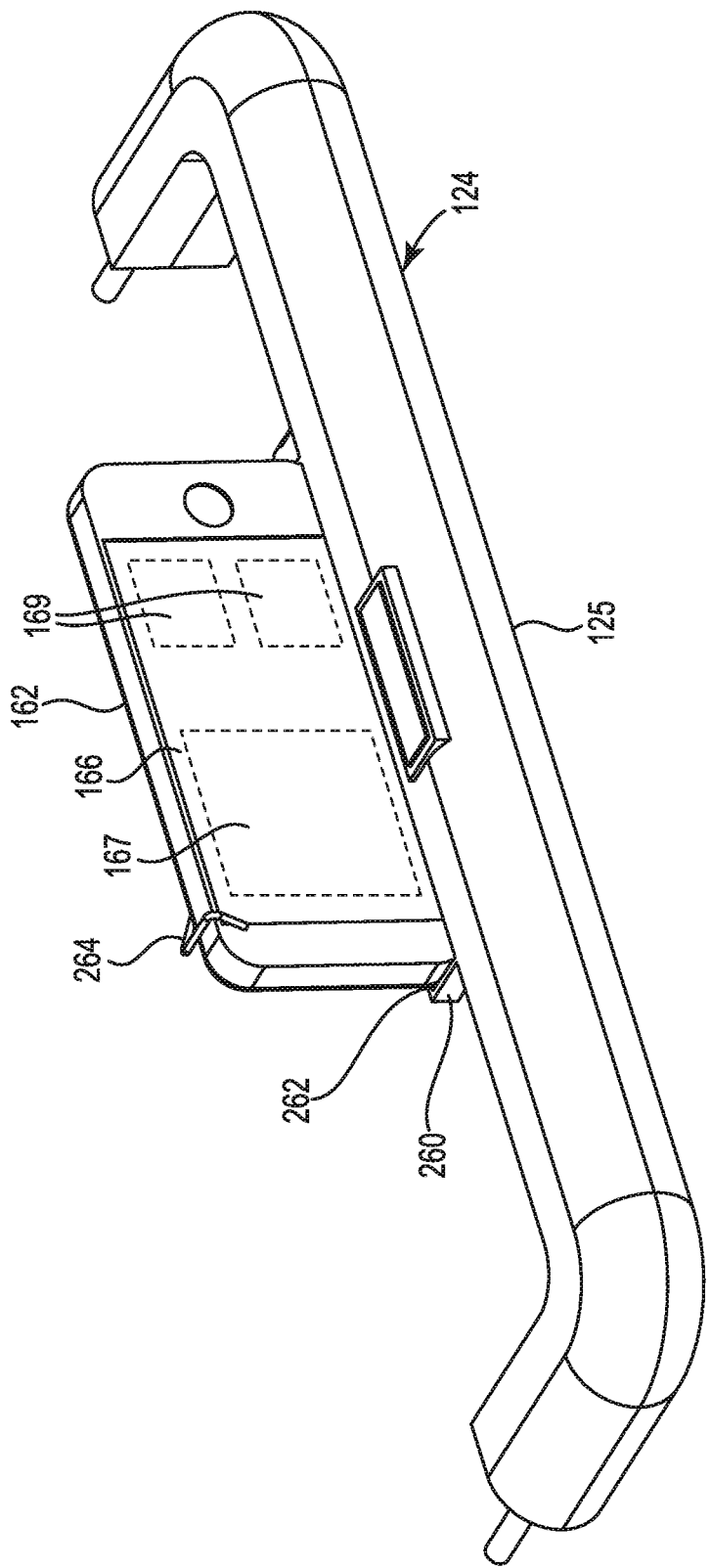
FIG. 27 is a perspective view of the cradle of FIG. 26 supporting a mobile device.

In some embodiments, a cradle 160 (see FIGS. 1 and 4) may be attached to and be part of the handle assembly. The cradle may be adapted to receive and hold a mobile computer 162 (e.g., smartphone) as shown in FIG. 27 in an orientation visible to the operator standing or walking behind the housing (when the handle assembly is in the manual mode position). The mobile computer may support a communication protocol compatible with a radio of the mower 100 (see, e.g., radio 141 in FIG. 3) for reasons further described below. Alternatively, the mower 100 and cradle 160 may include provisions for a wired connection (e.g., serial, Universal Serial Bus, etc.) to the controller 142. Regardless of the control interface provided to the operator, he or she may control and manipulate the mower by interacting with controls associated with the handle assembly 124 (e.g., with virtual controls on the mobile computer).

FIGS. 4-5 illustrate one embodiment of the handle assembly 124. As shown in these views, the handle assembly 124 may pivot in the direction 114 from the manual mode position (see broken line position in FIG. 4) to an intermediate position (see solid line position in FIG. 4), after which it may be telescopically received (slid in the direction 115) into handle channels 112 (left handle channel 112a and right handle channel112b) formed on the housing 102 (shown in dotted lines in FIGS. 1 and 4-5) to its autonomous mode position. That is to say, the handle assembly 124 is adapted to move between its first or autonomous mode position and its second or manual mode position via telescopic action. While the handle channels 112 are illustrated in FIG. 4 as being contained within the housing 102, other embodiments are contemplated. For example, the tubes 122 could slide into receptacles or guides (not shown) at, below, or above an upper surface of the housing 102.

To facilitate movement of the handle assembly 124 between the autonomous mode position and the manual mode position, the handle assembly 124 may be pivotally connected to the housing 102 at pivots 113 (e.g., tube 122a attached at pivot 113a and tube 122b attached at pivot 113b). The handle assembly 124/tubes may be locked in the position shown in FIG. 1, and subsequently released to allow for pivoting (folding) downwardly, as indicated by direction 114 in FIG. 4. Subsequent to pivoting downwardly, the handle assembly 124/tubes 122 may be slid forwardly (e.g., telescopically collapsed) into the handle channels 112 (e.g., the pivots 113 may be configured as slides that allow telescopic movement of the tubes 122 into the channels 112) as indicated by direction 115 in FIG. 5, resulting in the handle assembly 124 reaching the autonomous mode position. In the autonomous mode position, the handle assembly 124 may lie or extend generally parallel to the housing 102, e.g., parallel to the upper surface of the housing.

Conversely, the handle assembly 124/tubes 122 may be slid from or withdrawn from the handle channels 112 (pulled opposite the direction 115 in FIG. 5) and then pivoted upwardly (opposite of arrow 114 in FIG. 4) to the manual mode position shown in dotted lines in FIG. 4. Once again, a latch or similar mechanism may be associated with the pivots 113 to allow locking of the handle assembly in the manual mode position. The handle assembly 124 may optionally be locked in the autonomous mode position to prevent the tubes 122 from sliding out of the handle channels 112. Any suitable locking mechanism can be used for holding the handle assembly 124 in the manual mode position and/or the autonomous mode position.

FIGS. 6-8 and 9-11 illustrate a mower 110 in accordance with another embodiment of the disclosure. Like the mower 100, the mower 110 includes a handle assembly 124. However, instead of two rigid tubes 122a, 122b, the handle assembly of FIGS. 6-11 may include two tube assemblies 123 (left tube assembly 123a and right and right tube assembly 123b) that are each configured as a plurality of telescoping elements (e.g., elements 150, 151, 152). For instance, one (e.g., first) handle element 150 (150a, 150b) may be telescopically received within an intermediate handle element 151 (151a, 151b), wherein the first and intermediate handle elements are telescopically received within another (e.g., second) handle element 152 (152a, 152b). In the illustrated embodiment, the second handle element 152 of each (e.g., left and right) tube assembly 123 may be pivotally attached to the housing 102 as already described herein. While illustrated herein as incorporating three handle elements, each tube assembly (including alternate embodiments such as handle 724 described below) could be constructed of two handle elements. That is, each tube assembly could provide for the first handle element 150 to be telescopically received directly by the second handle element 152 without any intermediate handle element present. In still other embodiments, each tube assembly may include two or more intermediate handle elements to produce a tube assembly having four or more handle elements.

Each tube assembly 123 may again be laterally spaced from, and parallel to, the other and joined to the other near their respective upper ends by the transverse grip area 125, again producing a generally U-shaped handle assembly. The tube assemblies 123 may be pivotable, in the direction 127, from the manual mode position (illustrated in broken lines in FIG. 6), to a lowered, intermediate position (e.g., generally horizontal with the housing 102) as shown in FIG. 7.

Figure 7:
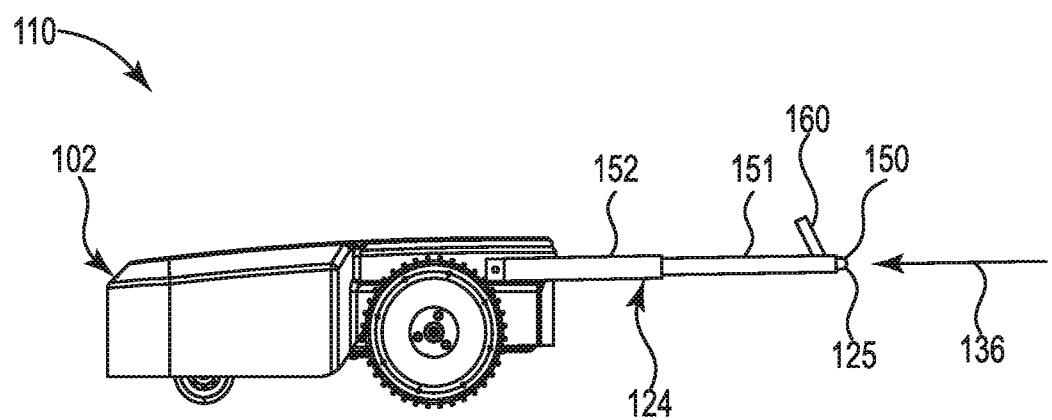
FIG. 7 illustrates the mower of FIG. 6 with the handle assembly of the mower shown partially telescopically retracted during transition to the autonomous mode position.
Figure 8:
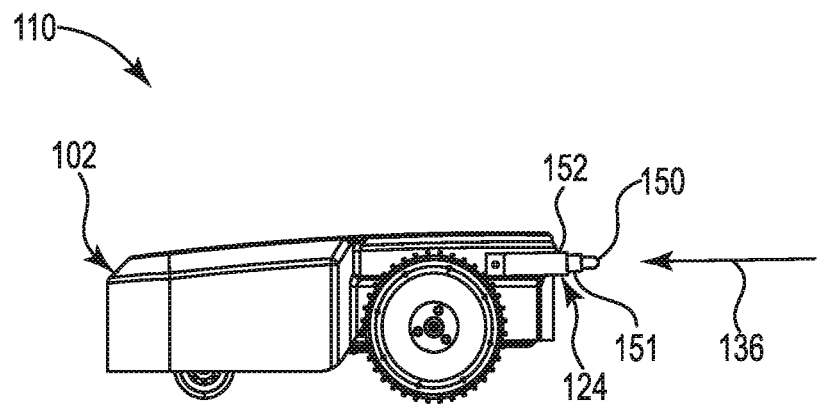
FIG. 8 illustrates the mower of FIG. 6 with the handle assembly in the autonomous mode position corresponding to the mower being in the autonomous mode.

As shown in FIGS. 7-8, each handle element 150 may be telescopically received within its associated intermediate handle element 151 by pushing in the direction 136. Each handle element 151 (which now includes its corresponding handle element 150 therein in this example) is then telescopically received within its respective handle element 152 by continuing to push in the direction 136, resulting in a telescopically collapsed handle assembly 124 stowed in close proximity to the housing 102. Regardless of the number of handle elements provided, when the handle assembly 124 is in the autonomous mode position, the first handle element is telescopically received within the second handle element and the second handle element is telescopically received by, or within, the housing 102.

Once again, while each of the two tube assemblies 123 is shown with three handle elements, any number (e.g., two or four or more) of handle elements may be used. Moreover, the elements 150, 151, and 152 may include various locks that permit the elements to remain in their extended relationship until the handle assembly is moved to the autonomous mode position. For example, female ends of the handle elements 123 may include a split collet and a threaded collar that permits the split collet to contract and expand in response to tightening and loosening, respectively, of the collar. Alternatively, male portions of each handle element may include a biased button that interacts with an aperture formed in the female portion of the associated handle element when the two handle elements are extended relative to each other to the positions corresponding to the manual mode position of the handle assembly. To collapse such a handle assembly, the operator may be required to depress the buttons sufficiently to permit the male elements to telescope back into the female elements. An example of another biased button embodiment is described further below with reference to FIGS. 14-24. Each of the tube assemblies 123 may also include a sensor or switch (not shown) that may indicate, to the controller 142, whether the tube is extended or collapsed.

Figure 6:
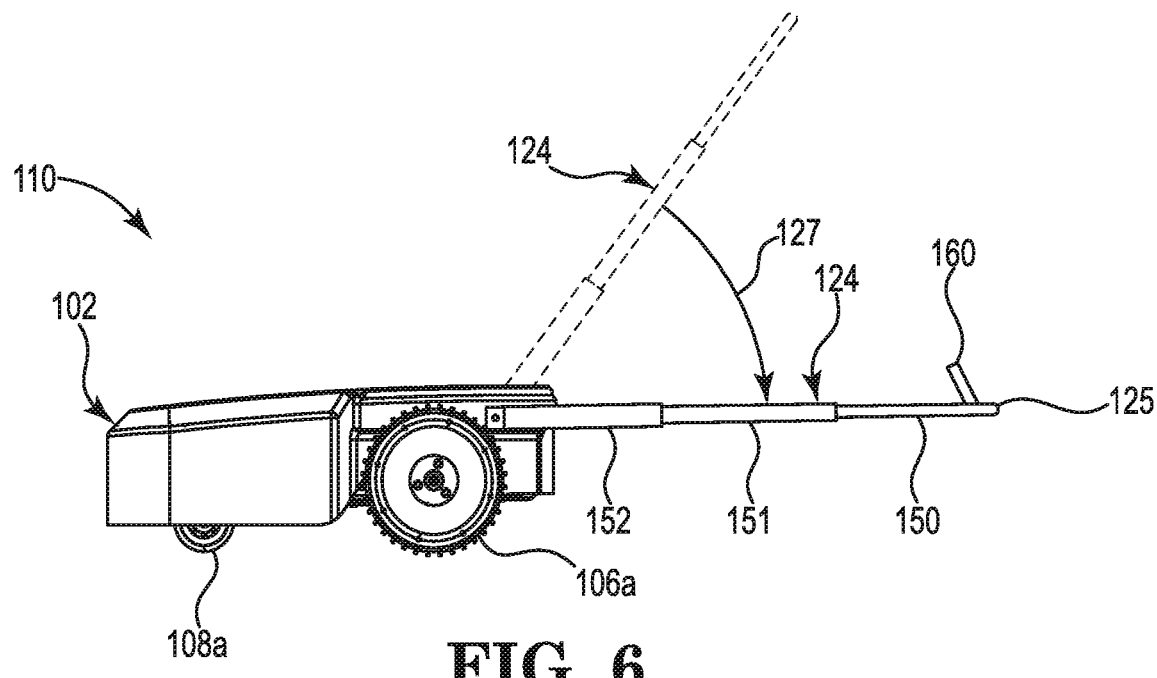
FIG. 6 is a side elevation view of an autonomous mower in accordance with other embodiments of the disclosure, wherein a handle assembly of the mower is shown in an intermediate position as the handle assembly transitions between a manual mode position and an autonomous mode position.
Figure 9:
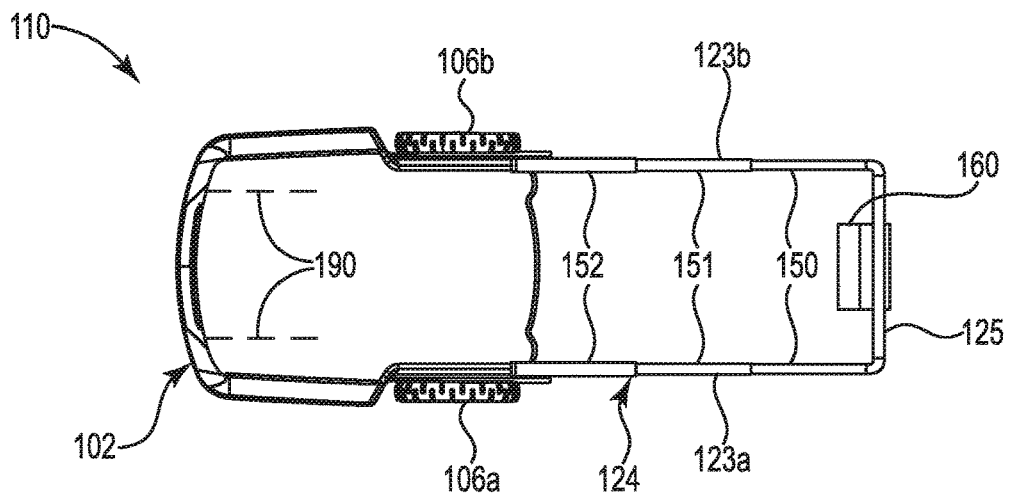
FIG. 9 is a top plan view of the mower of FIG. 6.
Figure 10:
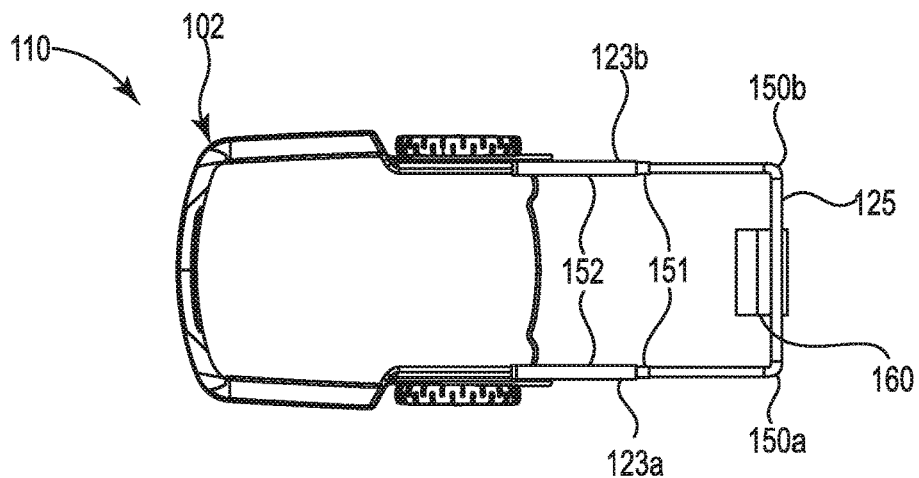
FIG. 10 is a top plan view of the mower of FIG. 7.
Figure 11:
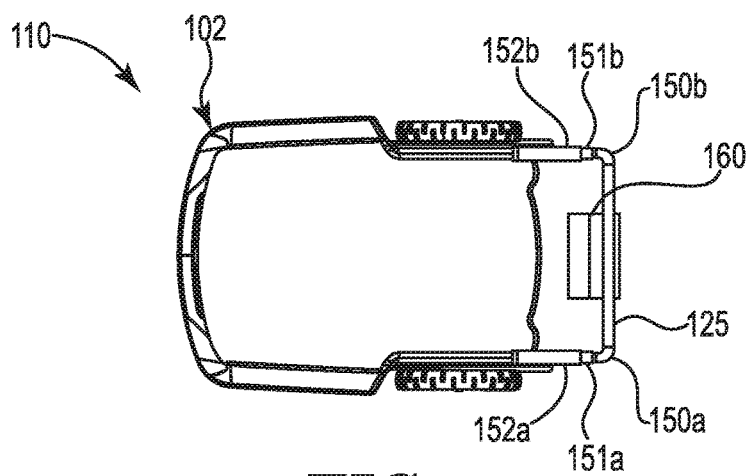
FIG. 11 is a top plan view of the mower of FIG. 8.

FIGS. 9-11 illustrate top plan views of the mower 110 of FIGS. 6-8, respectively, wherein: FIG. 9 illustrates the handle assembly 124 after pivoting to the intermediate position shown in FIG. 6; FIG. 10 illustrates the handle assembly 124 after handle elements 150 have been telescopically collapsed into their respective handle elements 151; and FIG. 11 illustrates the handle assembly 124 after the handle elements 151 have been collapsed into the respective handle elements 152.

While the mower 110 could operate autonomously with the handle assembly 124 protruding rearwardly as shown in FIGS. 8 and 11, FIGS. 12-13 illustrate yet another embodiment wherein the handle assembly 124, after having been telescopically collapsed to a position similar to that shown in FIGS. 8 and 11, is then pivoted forwardly, e.g., in the direction 119. That is, the mower 110 could, like the mower 100 described above, include pivots 113 (e.g., left pivot 113*a* and right pivot 113*b*) that permit the handle assembly 124 to be moved from a position extending behind the mower 110 (as illustrated in FIGS. 8 and 11), to a position contained within the mower footprint by pivoting the handle assembly 124 forwardly about the pivots 113.

Figure 12:
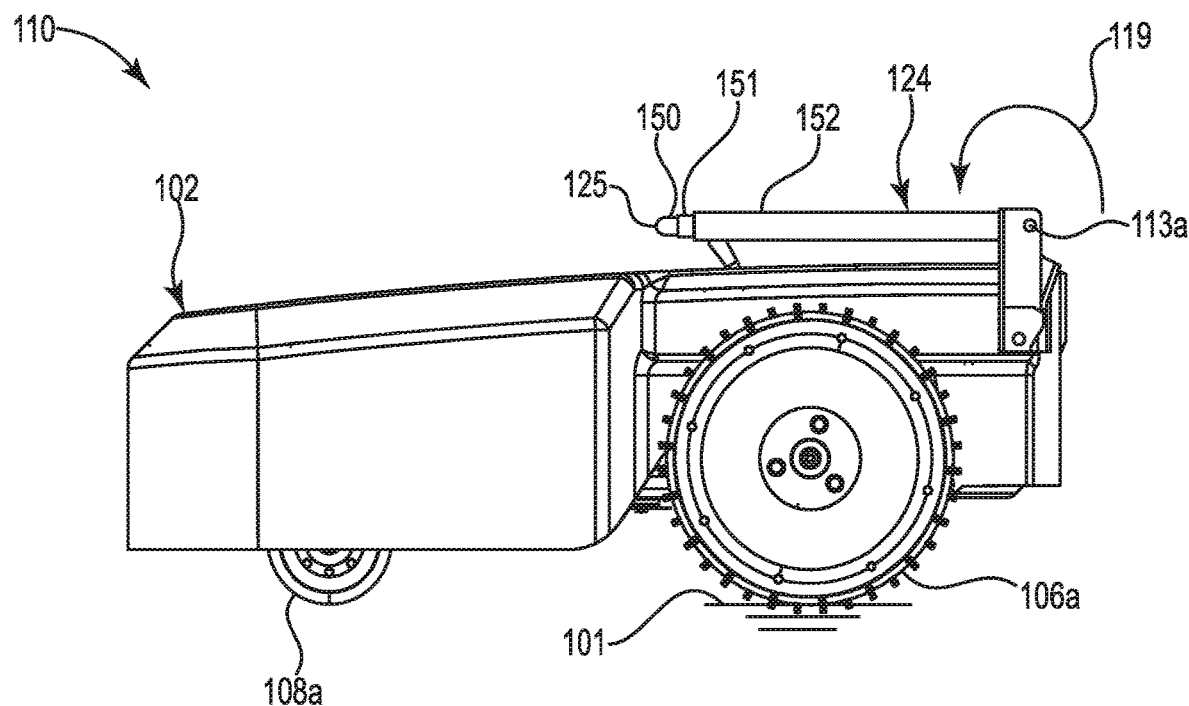
FIG. 12 is a side elevation view of an autonomous mower with a telescopically collapsed and folded handle assembly in accordance with other embodiments of the present disclosure, wherein the mower is shown in the autonomous mode with the handle assembly shown in a corresponding autonomous mode position.
Figure 13:
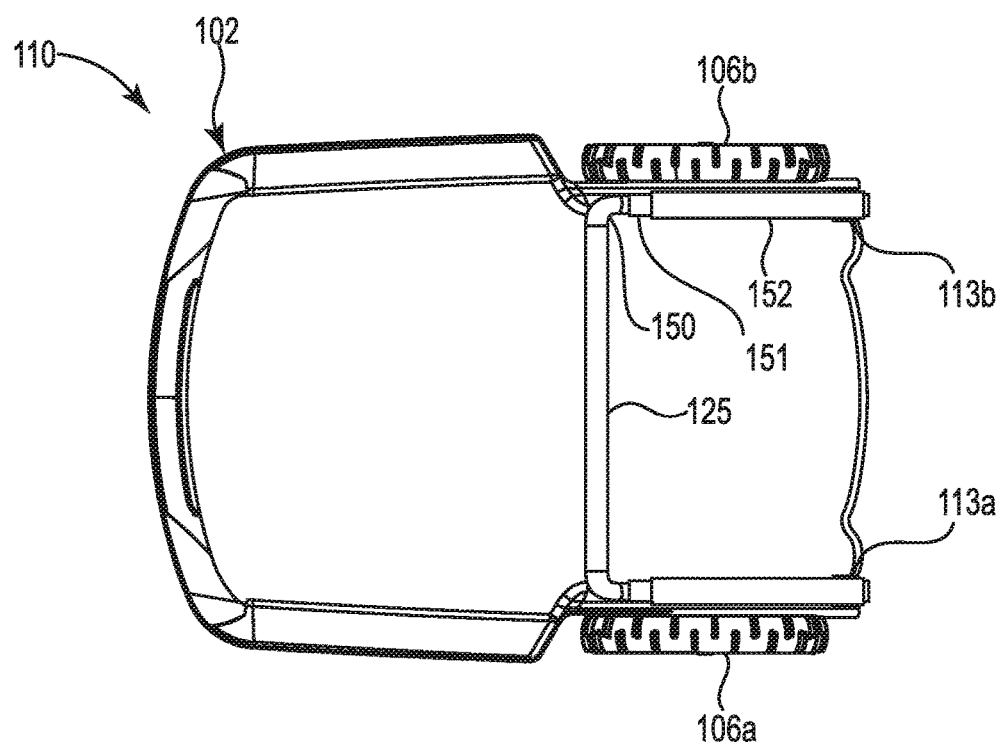
FIG. 13 is a top plan view of the mower of FIG. 12.

While the handle assembly 124 is illustrated as generally horizontal above the mower 110 in the autonomous mode position in FIGS. 12 and 13, such a position in not limiting. That is, other embodiments could position the handle assembly at an oblique angle relative to the housing 102 without departing from the scope of this disclosure. Regardless, once the handle assembly 124 in the autonomous mode position, the aforementioned switches/sensors 140 (see FIG. 3) may be used (at least in some embodiments) to indicate to the controller 142 that the handle assembly 124 is in the autonomous mode position and that the mower is ready (assuming other steps are taken) for autonomous operation.

Figure 14:
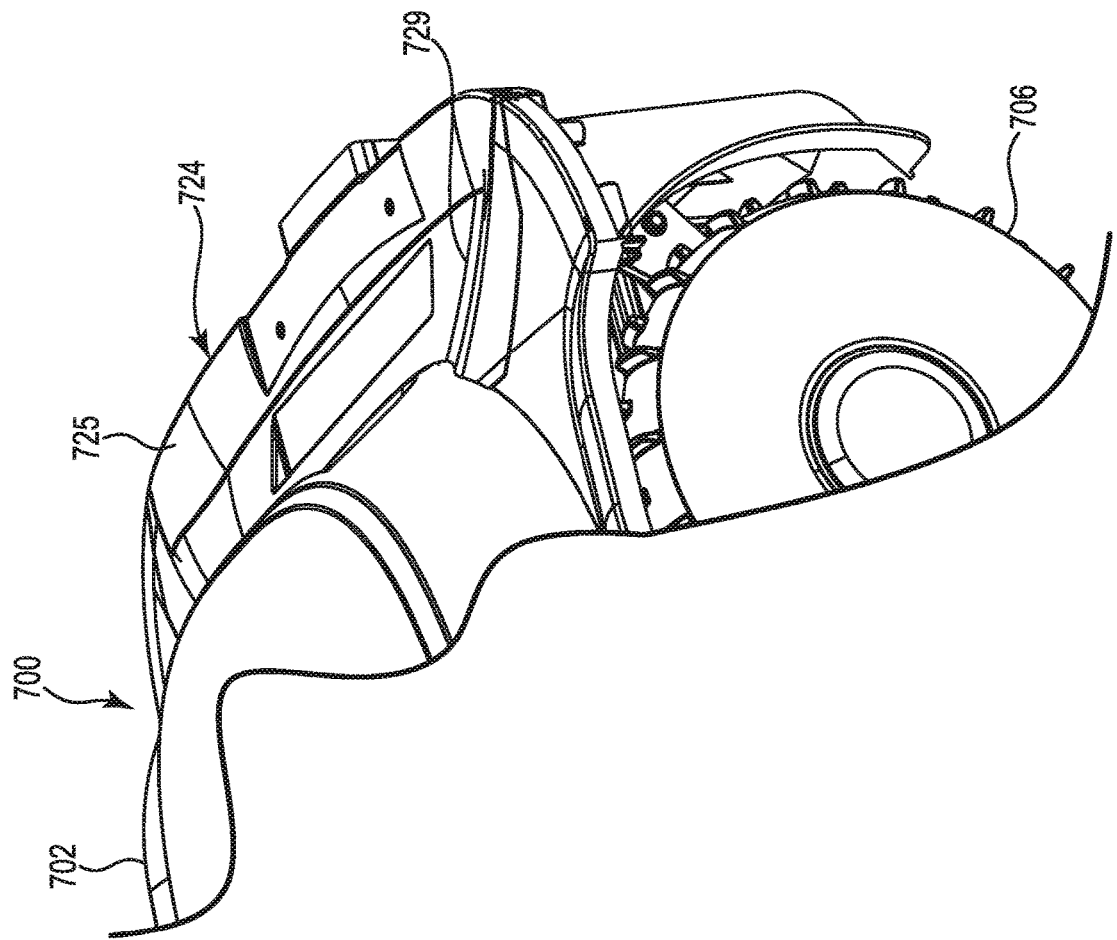
FIG. 14 is a partial perspective view of an autonomous mower in accordance with yet other embodiments of the present disclosure, wherein a handle assembly of the mower is shown in an autonomous mode position.
Figure 15:
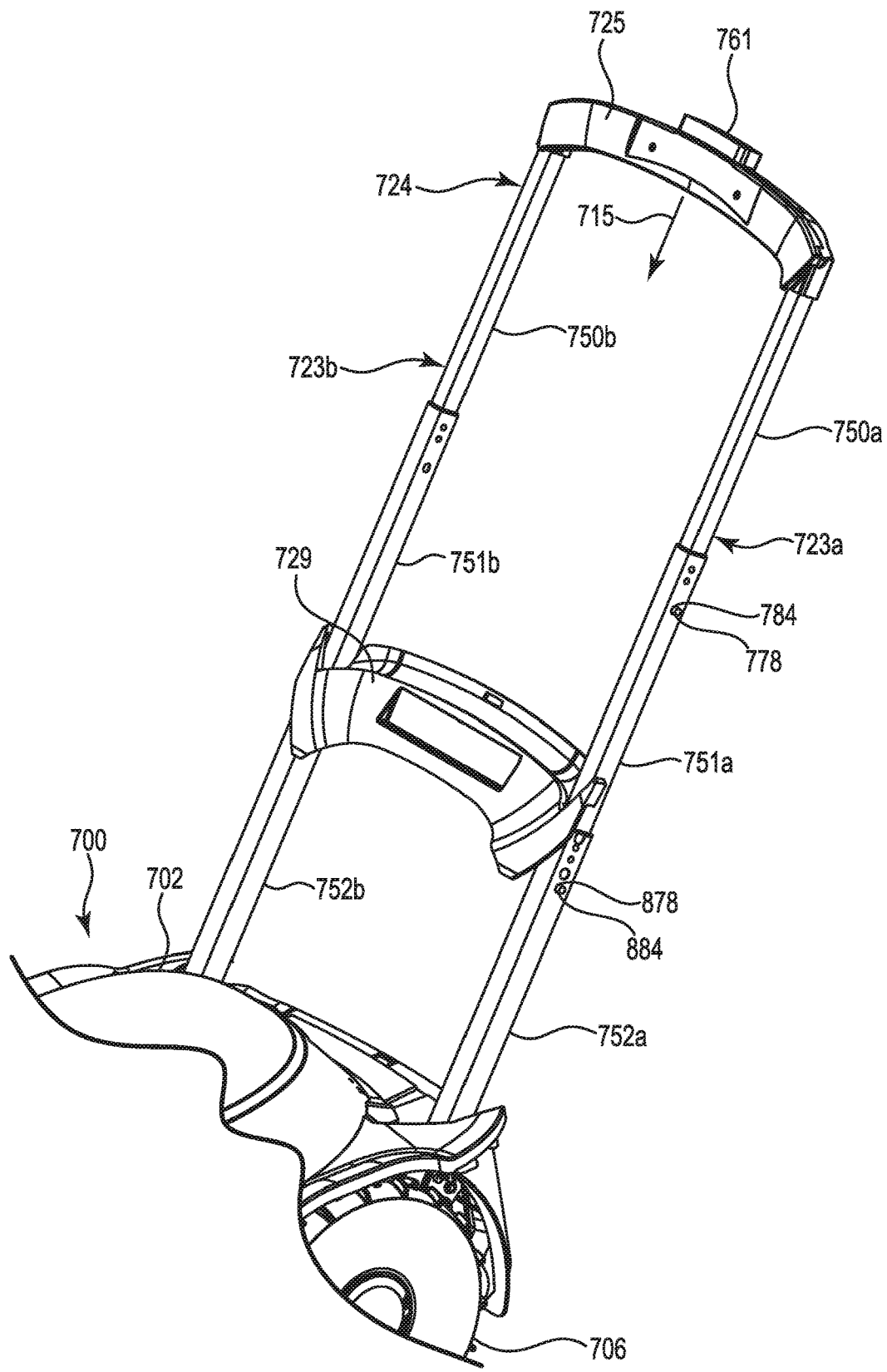
FIG. 15 is a partial perspective view of the mower of FIG. 14, wherein the handle assembly of the mower is shown in a manual mode position.

FIGS. 14-24 illustrate yet other embodiments of an autonomous mower 700 (shown partially in these views) incorporating a handle assembly 724 connected to a housing 702 and movable/reconfigurable between a first or autonomous mode position as shown in FIG. 14 (corresponding to an autonomous mode of the mower) and a second or manual mode position as shown in FIG. 15 (corresponding to a manual mode of the mower). Once again, in the manual mode position, the handle assembly 724 may extend outwardly (e.g., upwardly and rearwardly) from the housing 702 as shown.

Like the other mowers described herein, the mower 700 may include a housing 702 supported by ground-engaging members such as two rear wheels 706 and two front wheels (not shown). Other aspects of the mower 700 that are not described and/or illustrated may be generally similar to the mowers 100, 110 (e.g., the mower 700 may include front wheels, a cutting blade assembly, motor(s), controller, etc. that are the same or similar to the components already described herein in the context of the mowers 100, 110) and, as such, are not separately described herein.

The handle assembly 724 may again be formed by telescoping sections that permit the handle assembly to extend as shown in FIG. 15 during manual mode operation of the mower and collapse to the position shown in FIG. 14 for autonomous mode operation. To permit this collapsing capability, the handle assembly 724 may include two (e.g., left and right) handle tube assemblies 723 (left tube assembly 723*a* and right tube assembly 123*b*) that each include two or more (e.g., first and second) nesting or telescoping handle elements. For example, each tube assembly 723 may include a first handle element 750 (left and right handle elements 750*a*, 750*b*) that may be telescopically received within a corresponding intermediate handle element 751 (left and right handle elements 751*a*, 751*b*), wherein each intermediate handle element 751 (with its associated first handle element 750) may be telescopically received within a corresponding second handle element 752 (left and right handle elements 752*a*, 752*b*). As shown in FIGS. 14-15, the handle element 752 of each tube assembly 723 may, when the handle assembly is in the autonomous mode position, remain connected to and be telescopically received within the housing 702 as further described below. Thus, as indicated in FIG. 14, the handle elements 750, 751, and 752 may, once collapsed, be stored substantially within the housing 702 of the mower. As is evident in FIG. 15, the handle assembly 724 may optionally include a transverse brace 729 that may be attached to the upper ends of the two handle elements 752 as shown.

As with the other handle assemblies described herein, each tube assembly 723 may be laterally spaced from, and parallel to, the other. Moreover, the tube assemblies 723 may be joined to each other near their respective distal ends (e.g., near their upper ends when the handle assembly is in the manual mode position of FIG. 15) by a transverse grip area 725 that is (when the handle assembly is again in the manual mode position) spaced apart from the housing, resulting once again in a generally U-shaped handle assembly. The grip area 725 may again provide a grip for grasping by a walk-behind operator during manual mode operation of the mower. As used herein with reference to the handle assembly 724, "distal" refers to a portion of the handle assembly or a handle element that is closer to the grip area 725, while the term "proximal" refers to the opposite end of the handle assembly or handle element (that portion closer to the housing when the handle assembly is in the manual mode position).

Figure 16:
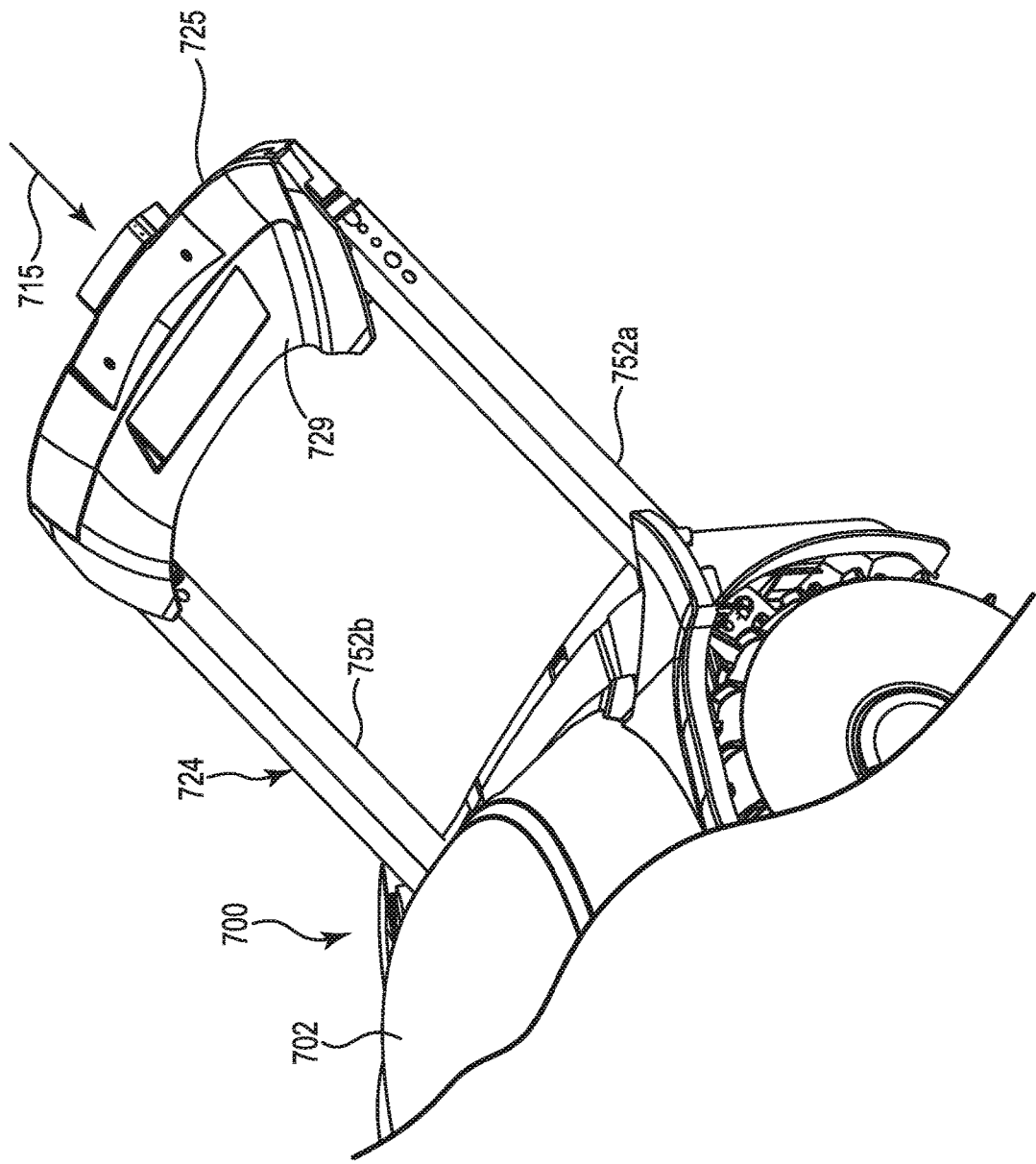
FIG. 16 is a partial perspective view of the mower of FIGS. 14-15, wherein the handle assembly of the mower is shown in a first intermediate position between the manual mode position and the autonomous mode position.

To reconfigure the handle assembly 724 from the manual mode position shown in FIG. 15 to the autonomous mode position shown in FIG. 14, the handle assembly may first be collapsed, e.g., by manually displacing the grip area 725 in the direction 715 as shown in FIG. 16. As the handle assembly is collapsed, the associated handle elements 750 may telescope into handle elements 751, and then into the associated handle elements 752 as shown. When the handle elements 750, 751, and 752 of both tube assemblies 723 are sufficiently collapsed as shown in FIG. 16, the handle assembly 724 may partially disengage from the housing 702 in a manner that permits the handle assembly to pivot, relative to the housing 702 in the direction 755, to the position shown in FIG. 17. Once the handle assembly 724 reaches the position shown in FIG. 17, it may be pushed in the direction 756 until it reaches the autonomous mode position shown in FIG. 14. The handle assembly 724 may be positively retained in the autonomous mode position, or it may be retained in place via friction of the various components (e.g., friction between the handle elements 750, 751, and 752).

Figure 18:
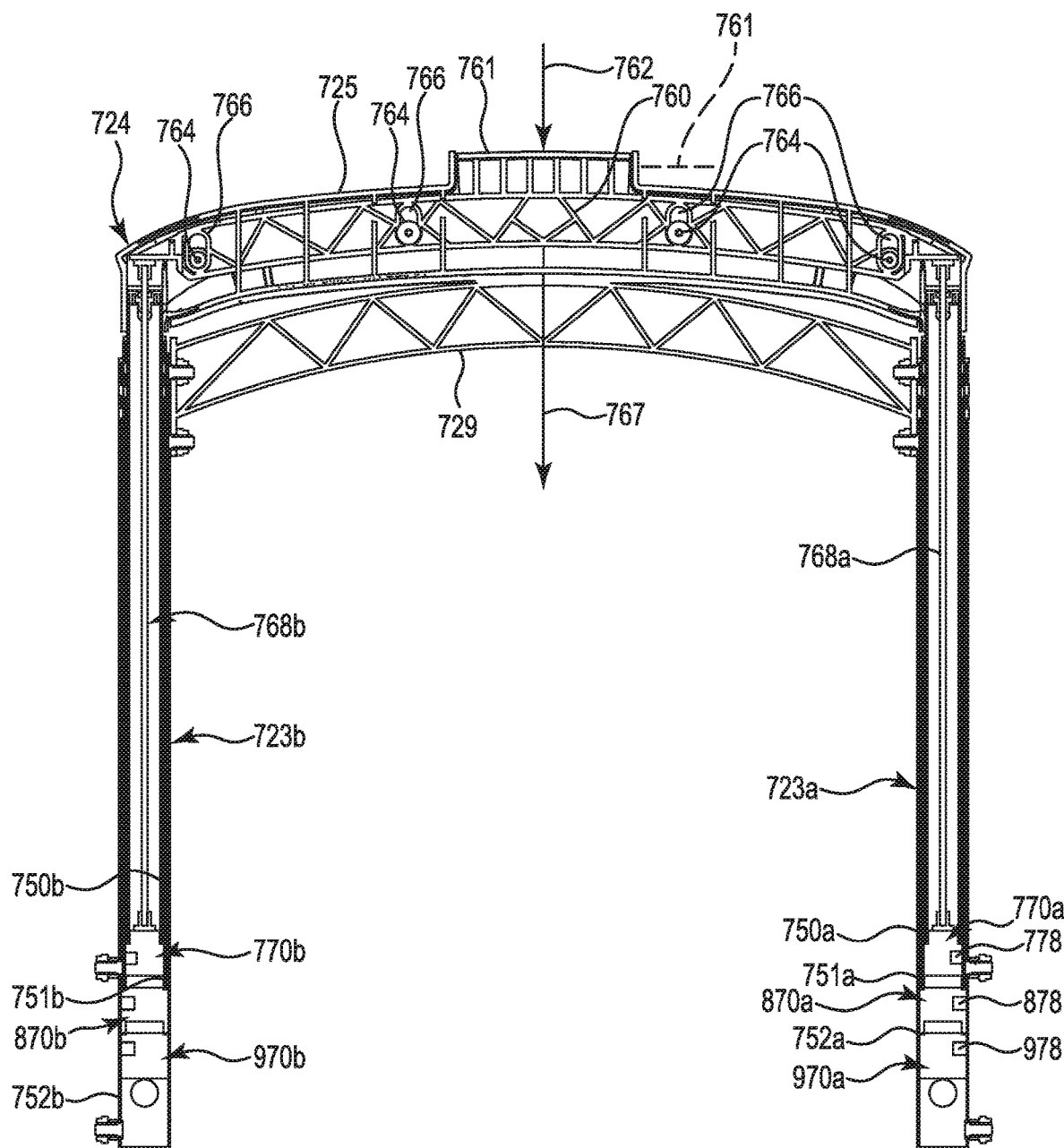
FIG. 18 is an isolated section view of a handle assembly in accordance with embodiments of the present disclosure, the handle assembly shown in a collapsed position corresponding to an autonomous mode position.
Figure 19:
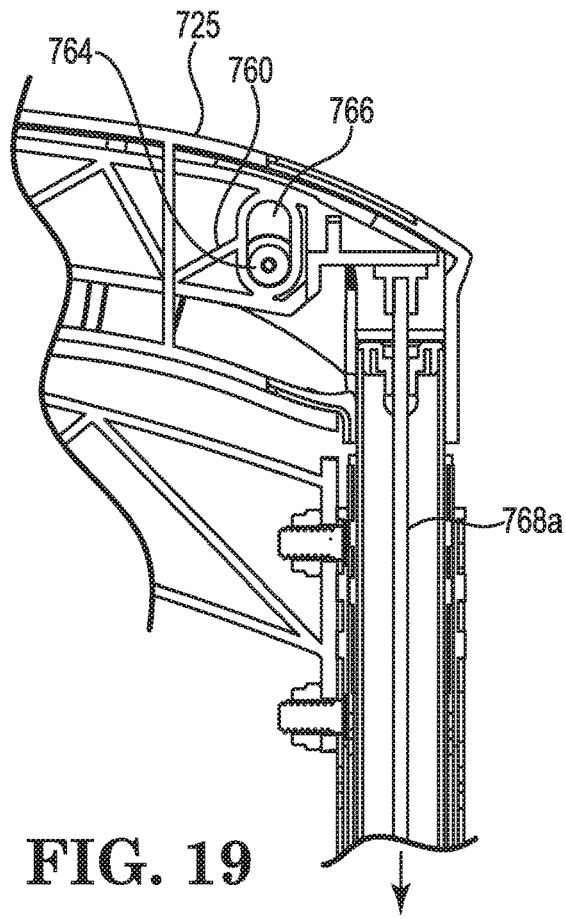
FIG. 19 is an enlarged partial view of a distal portion of the handle assembly of FIG. 18.
Figure 20:
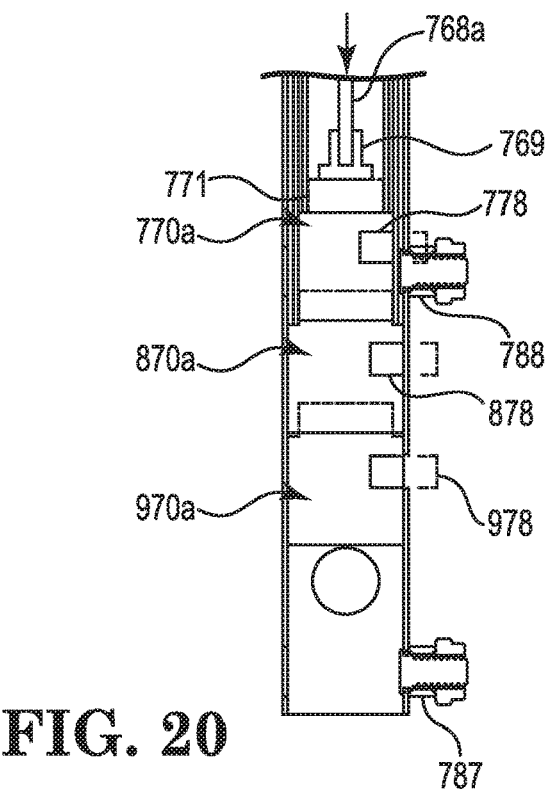
FIG. 20 is an enlarged partial view of a proximal portion of the handle assembly of FIG. 18.

FIG. 18 illustrates the exemplary handle assembly 724 in isolated section when the handle assembly is in a collapsed position (i.e., as it may be when in the autonomous mode position), and FIGS. 19-20 shown enlarged portions of the same. As shown in these views, the grip area 725 may include or have connected thereto an actuator 760. The actuator 760 may include a button portion 761 extending outwardly through the grip area 725 so as to be accessible (e.g., for pushing) by the operator. Upon application of a manual force applied to the button portion 761 in a direction 762, the actuator 760 may move in the direction 767 relative to the grip area 725 between a neutral position (solid line portion 761 in FIG. 18) to an actuated position (partial broken line portion 761 in FIG. 18). To constrain movement of the actuator 760 to the desired direction 767 (such direction being parallel to a centerline axis of the tube assemblies 723), the actuator may define slots 766 that receive pins 764 associated with the grip area 725. Selective movement of the actuator 761 as described may allow unlocking of the handle assembly 724, i.e., movement may permit the handle element 750 to be telescopically received within the handle element 751, the latter of which may be telescopically received within the handle element 752, and the handle element 752 to be telescopically received within the housing 702.

As the actuator 760 is displaced, relative to the grip area 725 in the direction 767, a rod 768 (left and right rods 768a, 768b) contained within each tube assembly 723 is correspondingly displaced (e.g., downwardly in FIGS. 18-20). A distal end of each rod 768 may include a plunger 769 that, as the rod moves in the direction 767, presses against a button 771 of an associated pin lock assembly 770 (see left pin lock assembly 770a and right pin lock assembly 770b), an example of which is illustrated diagrammatically in FIG. 21 (note that while pin lock assembly 770a is illustrated in FIG. 21, assembly 770b may be generally identical).

Each pin lock assembly 770 may include a body 774 having a base surface 765. The button 771 is journaled for movement relative to the body in the direction 767 (and in a direction opposite thereto). The button 761 may include an angled guide or slot 776 in which a follower 777 may move. The follower 777 is connected to a pin 778 that is journaled for movement in a direction 779 (and in a direction opposite thereto), which may be orthogonal to the direction 767. The button 771 and the pin 778 may be constrained for movement in their desired directions by bushings or bearings 780 as shown in FIG. 21.

Figure 21:
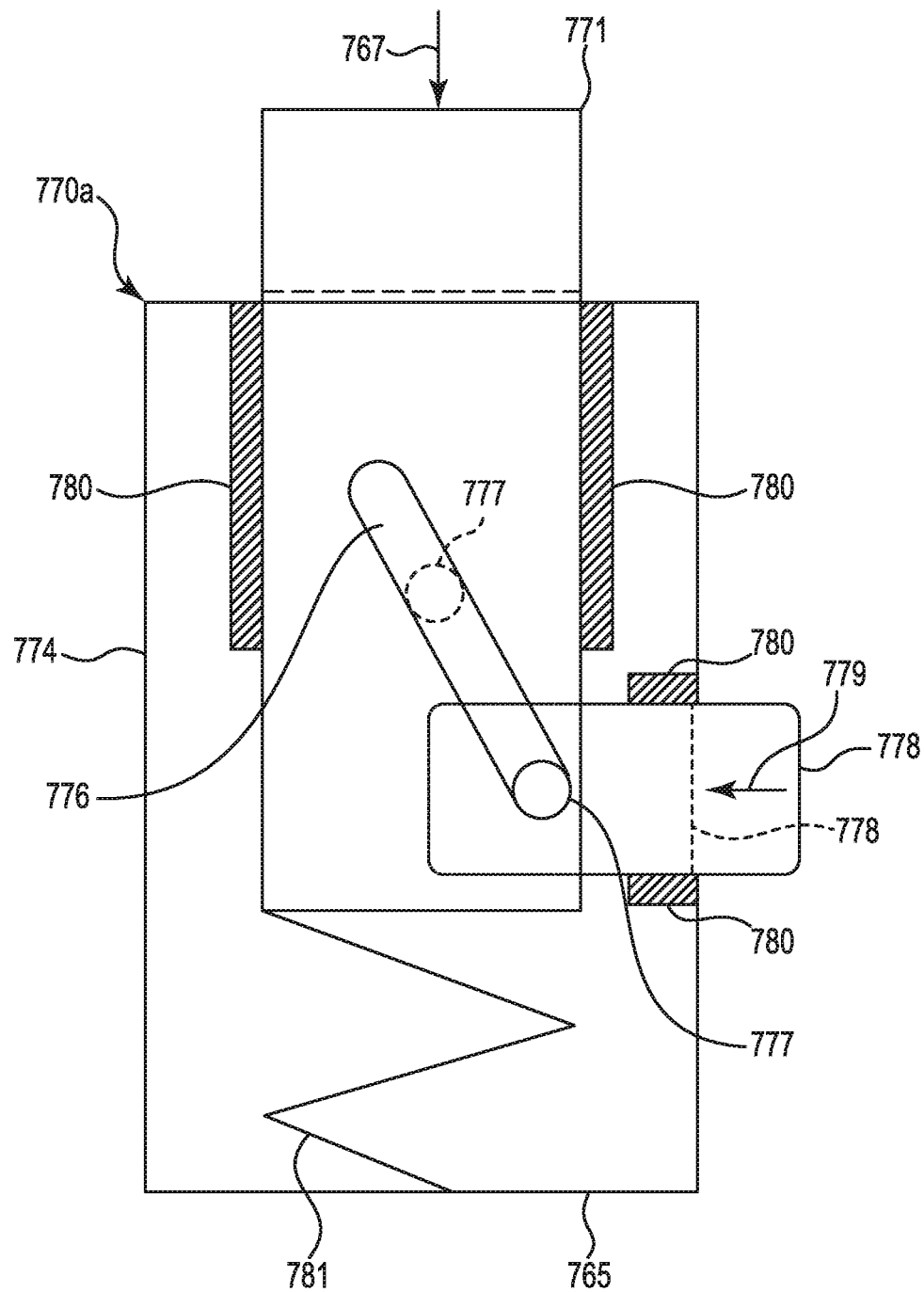
FIG. 21 is a diagrammatic view of a pin lock assembly in accordance with embodiments of the present disclosure.

A spring or other biasing element 781 may bias the button 771, thus biasing the pin 778 to the extended position shown in solid lines in FIG. 21. When the button 771 is depressed (due to the force applied by the rod 768 in the direction 767), the follower 777 may move from the location shown in solid lines within the slot 776, to the relative position within the slot shown in broken lines (actual pin movement would be in direction 779 only). As a result, the pin 778 retracts into the body 774 (e.g., from the location shown in solid lines to the location shown in broken lines).

As shown in FIGS. 18 and 20, a pin lock assembly 770 is associated with a proximal end of each of the handle elements 750 and is adapted to effectively lock the corresponding handle element 750 relative to the associated handle element 751 when the handle assembly is in the manual mode position. Similarly, a pin lock assembly 870 (870a, 870b) having a pin 878 (similar to the pin 778) is associated with a proximal end of each of the handle elements 751 and is adapted to effectively lock the corresponding handle element 751 relative to the associated handle element 752 when the handle assembly is in the manual mode position. Further, a pin lock assembly 970 (970a, 970b) having a pin 978 (again, similar to the pin 778) is associated with a proximal end of each of the handle elements 752 and is adapted to effectively lock the corresponding handle element 752 relative to the housing 702 when the handle assembly is in the manual mode position. The pin lock assemblies 870 and 970 may be similar (e.g., differing only in size) or even identical in construction and operation to the pin lock assembly 770 and are thus not separately described herein.

The pin lock assemblies 770, 870, and 970 may be used to lock or otherwise secure the associated handle elements of the handle assembly 724 relative to the housing 702 in an extended position (e.g., as when the handle assembly is in the manual mode position of FIG. 15). More specifically, the pins 778, 878, and 978 of the respective pin lock assemblies 770, 870, and 970 may be biased outwardly such that they may engage apertures provided in the various handle elements and in the mower housing 702 as further described below to secure the handle assembly in the manual mode position of FIG. 15. Moreover, the pins 778, 878, and 978 of each pin lock assembly may be selectively released to permit collapse of the handle assembly 724 and movement of the same to the autonomous mode position of FIG. 14.

Figure 22:
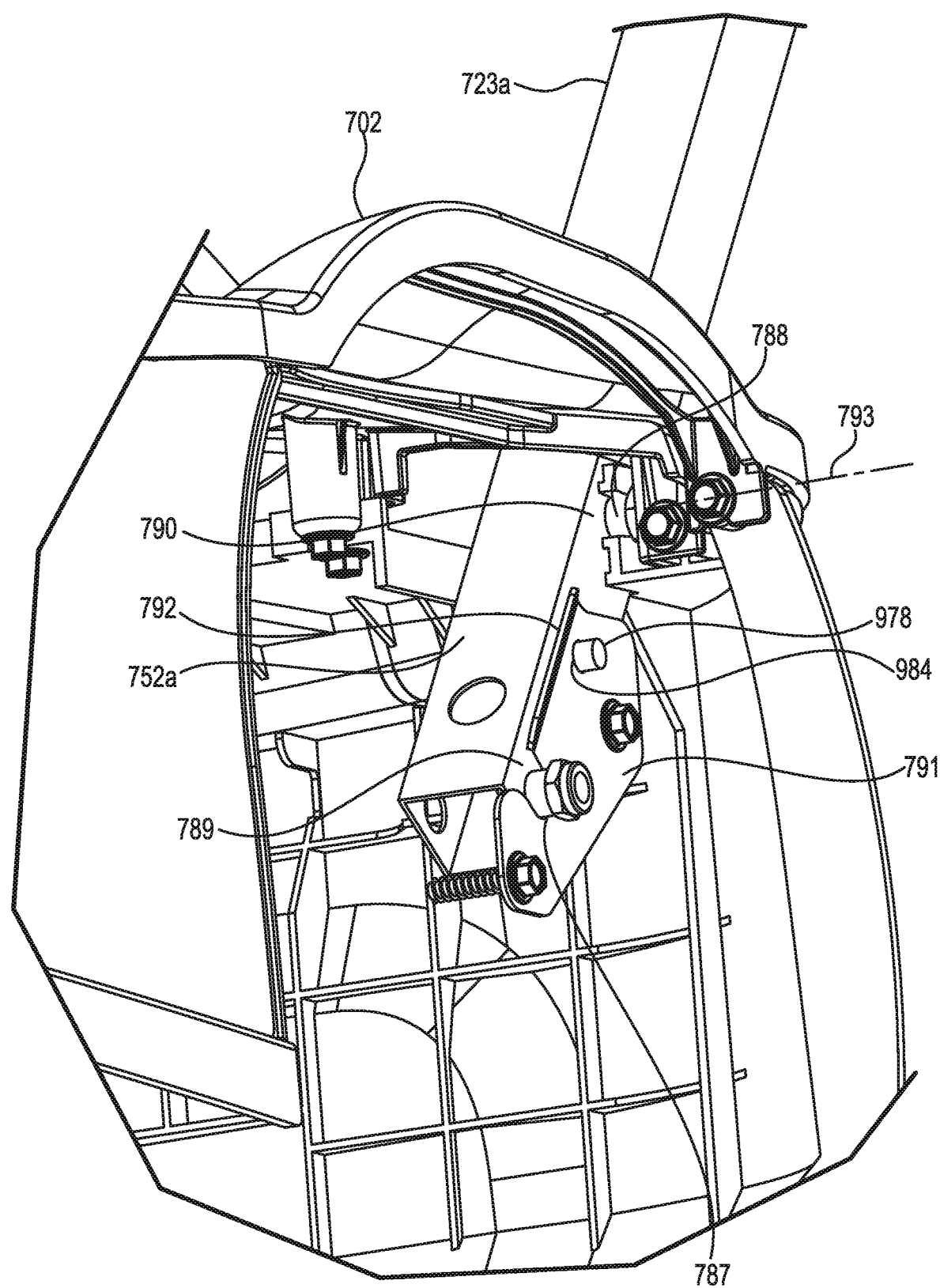
FIG. 22 is an enlarged partial perspective view of the mower of FIGS. 14-15 illustrating an interface between the handle assembly and a housing of the mower.

When the handle assembly 724 is in the manual mode position as shown in FIGS. 15 and 22, each handle element 750 may be extended (relative to the associated handle member 751) sufficiently to align its associated pin 778 with an aperture 784 formed near a distal end of the associated handle element 751. Due to the outward bias of the pin 778, it may engage the aperture 784 and lock or secure the handle element 750 relative to the associated handle element 751 (when the handle assembly is in the manual mode position).

In a similar manner, each handle element 751 may be extended (relative to the associated handle element 752) sufficiently to align the pin 878 with an aperture 884 formed near a distal end of the handle element 752. Due to the outward bias of the pin 878, it may engage the associated aperture 884 and secure the handle element 751 relative to the associated handle element 752.

Figure 17:
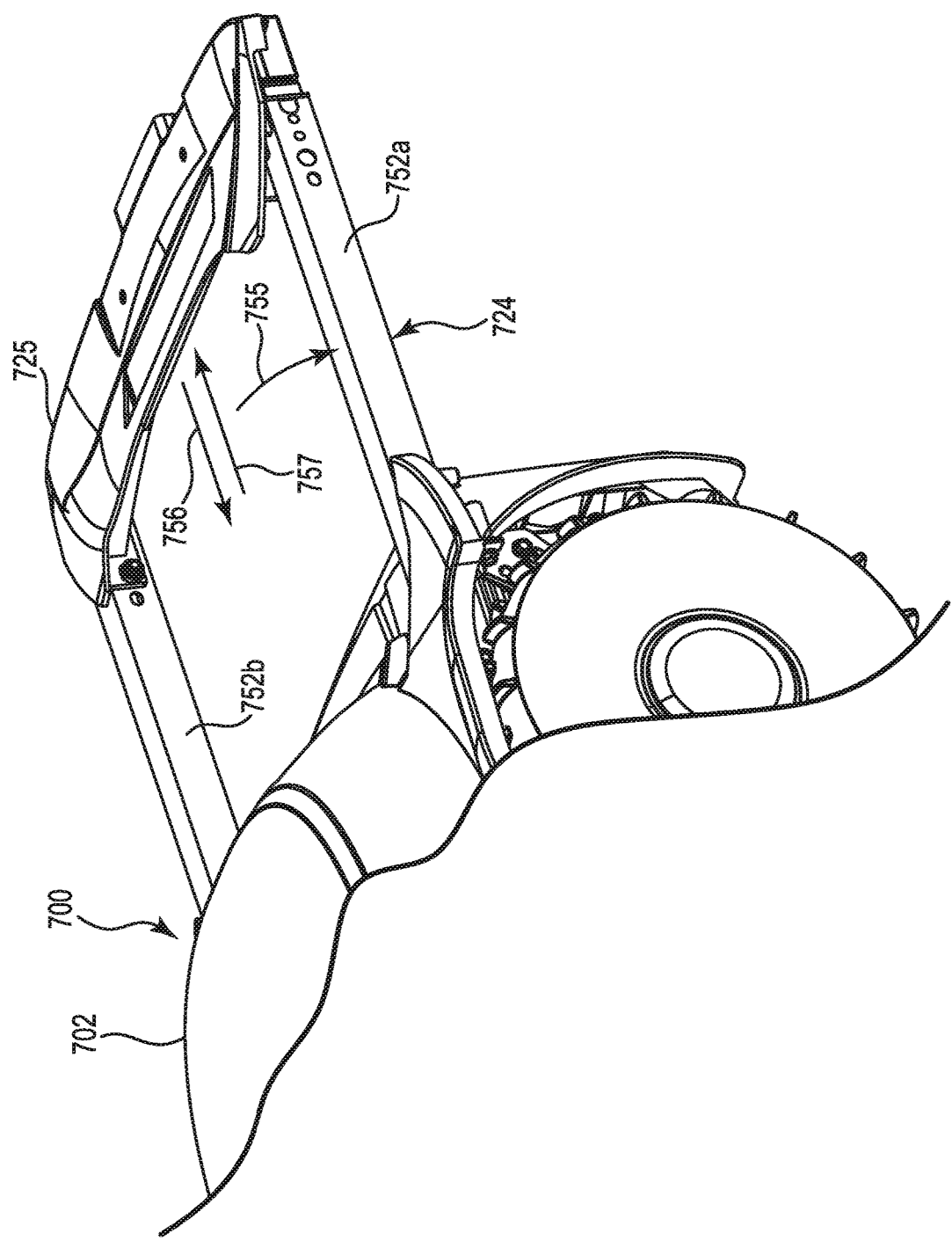
FIG. 17 is a partial perspective view of the mower of FIGS. 14-15, wherein the handle assembly of the mower is shown in a second intermediate position between the manual mode position and the autonomous mode position.
Figure 23:
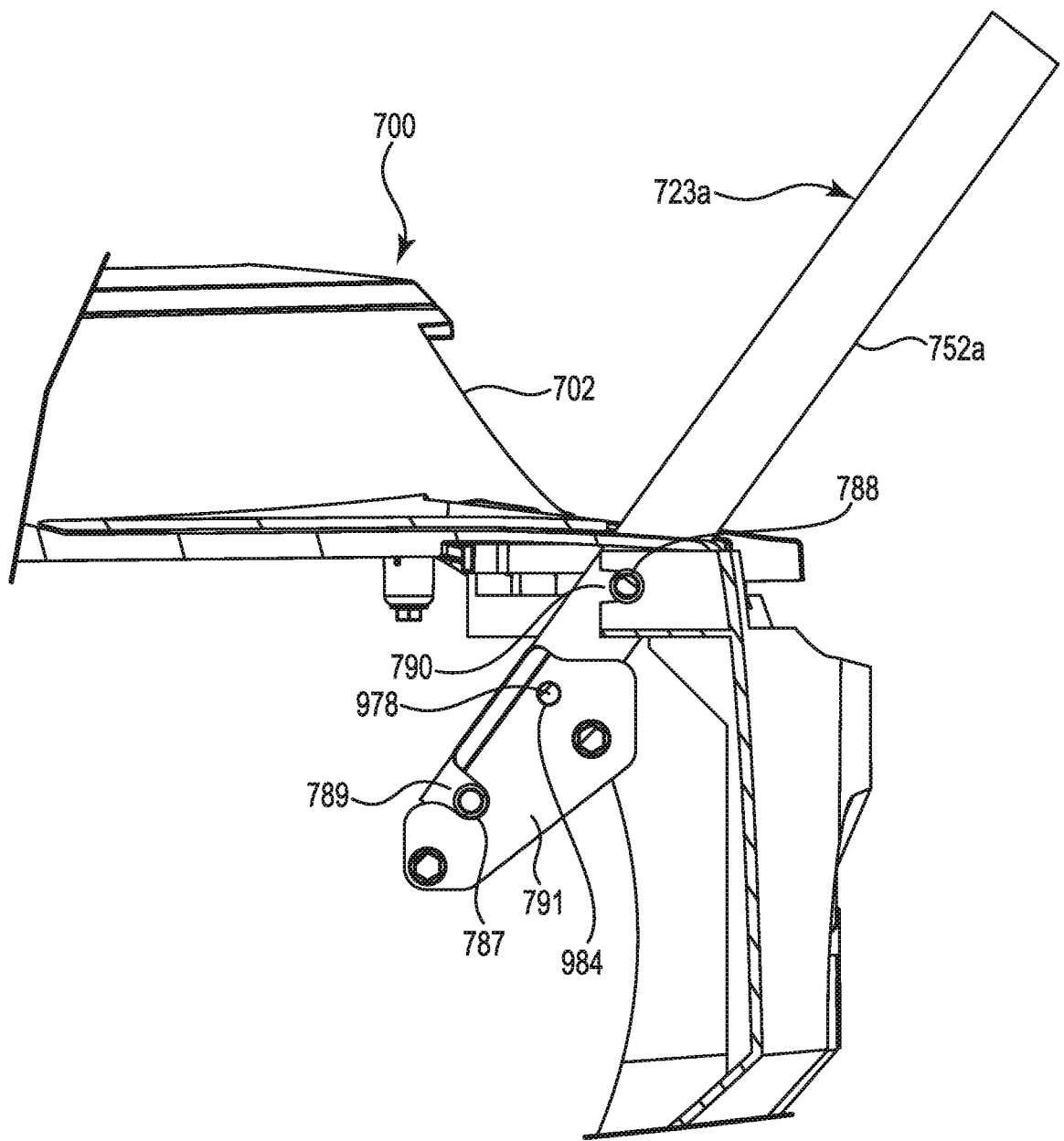
FIG. 23 is an enlarged partial side elevation view of the mower of FIGS. 14-15 again illustrating the interface between the handle assembly and the housing of the mower.

As shown in FIG. 20, each handle element 752 may include a first pin 787 and a second pin 788 near its respective proximal end. The pins 787 and 788 are adapted to abut corresponding surfaces within slots 789 and 790, respectively, formed in a bracket 791 of the housing 702 when the handle assembly is in the manual mode position as shown in FIGS. 22 and 23. To place the handle assembly 724 in this position, each handle element 752 may be withdrawn from the housing 702 (e.g., pulled in the direction 757 as shown in FIG. 17) until the associated pins 788 each seat fully into their associated slots 790. At this point, the handle assembly 724 may pivot about a pivot axis 793 (see FIG. 22) defined by the pin 788 from the position shown in FIG. 17 to the position shown in FIG. 16 (e.g., as the handle assembly pivots, relative to the housing, from the autonomous mode position toward the manual mode position). As this pivoting occurs, the pins 787 may ultimately swing into and fully seat within their associated slots 789, at which point the pins 978 (see FIG. 22) may engage associated apertures 984 in the respective brackets 791. Each of the left and right brackets 791 may provide a ramped face 792 that allows the associated pin 978 to retract as the handle assembly pivots toward the position shown in FIG. 22. Due to the outward bias of the pin 978, however, the pin may extend and engage the aperture 984 and secure the respective handle element 752 relative to the housing 702 at a position corresponding to the manual mode position shown in FIG. 15. As one can appreciate, the pin lock assemblies 970 may also lock the handle assembly 724 at a predetermined angular orientation relative to the housing 702 when the handle assembly is in the manual mode position.

To move the handle assembly 724 from the manual mode position of FIG. 15 to the autonomous mode position of FIG. 14, the operator may first depress the button 761 (see FIGS. 15 and 18), thereby translating the actuator 760 relative to the grip area 725 in the direction 767. As the actuator is depressed, the rods 768 (768a and 768b) are displaced toward the mower housing 702. This movement causes the button 771 of each pin lock assembly 770 to depress, retracting the pins 778 from the associated apertures 784. As the pins 778 retract, each handle element 750 is able to telescope or retract into its respective handle element 751.

As each handle element 750 retracts into its associated handle element 751, the base surface 765 (see FIG. 21) of each pin lock assembly 770 eventually contacts and depresses a button (like button 771) of the associated pin lock assembly 870, effectively retracting the pin 878 from the aperture 884 of the handle element 752. Thus, the combined handle elements 750, 752 are able to retract into their respective handle members 752.

As each pair of combined handle elements 750, 751 retract further, a base surface (like base surface 765 of pin lock assembly 770) of each pin lock assembly 870 eventually contacts and depresses a button (like button 771) of the associated pin lock assembly 970, effectively retracting its associated pin 978 from the aperture 984 of the bracket 791 (see FIG. 22). With both pins 978 retracted, the handle assembly 724 is adapted to pivot (about the axis 793 in FIG. 22) from the position shown in FIG. 16 to the position shown in FIG. 17 by pivoting in the direction 755. Such pivoting is accommodated by the pins 788 rotating relative to surfaces forming their respective slots 790 (see FIGS. 22 and 23).

Once the handle assembly 724 is positioned in a generally horizontal position as shown in FIG. 17, it may be advanced toward the housing 702 (e.g., moved in the direction 756 shown in FIG. 17) until the handle assembly is located in the autonomous mode position shown in FIG. 14.

Figure 24:
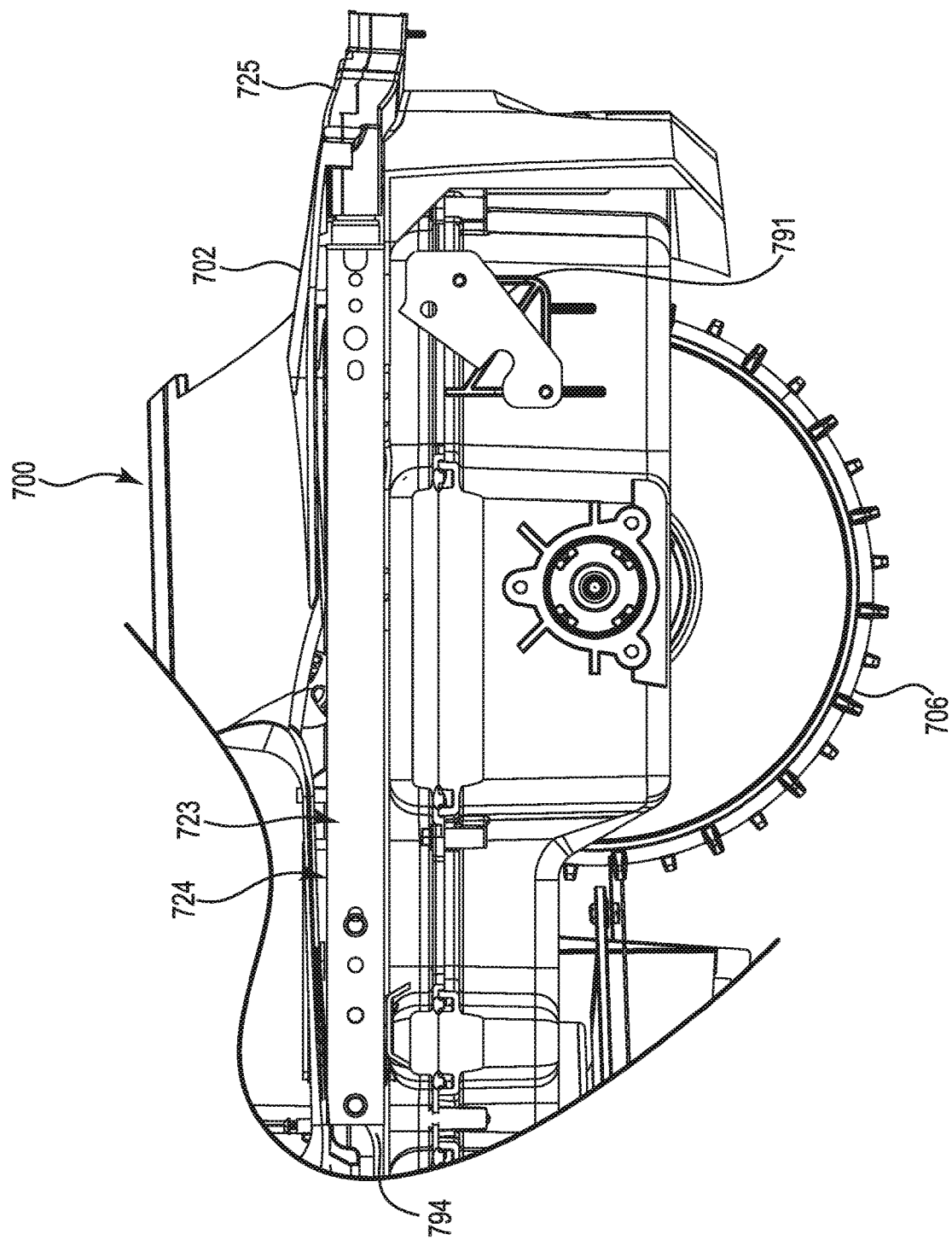
FIG. 24 is an enlarged partial side section view of the mower of FIG. 14 (the handle assembly shown in the autonomous mode position)

As shown in FIGS. 14 and 24, the handle elements 750, 751, and 752 may be contained mostly, or even completely, within the housing 702 when the handle assembly 724 is in the autonomous mode position. That is to say, the housing 702 (e.g., the chassis and/or bump shroud) may define two channels 794 each adapted to telescopically receive the corresponding handle tube assembly 723 (e.g., a separate channel may be provided for each of the left and right tube assemblies) when the handle assembly is in the autonomous mode position. In addition to reducing debris collecting on the handle elements and the pin lock assemblies, internal storage of the handle assembly elements may reduce the chances that the handle 724 might catch on objects (e.g., shrubs, trees, etc.) when the mower operates in the autonomous mode. In some embodiments, the grip portion 725 of the handle assembly 724 may be positively retained relative to the housing (e.g., by engaging a feature provided on either the bump shroud or the chassis) when the handle assembly is in the autonomous mode position.

While various handle assembly embodiments are described and illustrated separately herein, components of the various embodiments may be combined without departing from this disclosure. For example, while the brace 729 is shown with the handle assembly 724, it could also be included with the other handle assemblies 124 described herein. Similarly, although not shown in the embodiments illustrated in FIGS. 14-24, the handle assembly 724 could also include a cradle (see, e.g., cradle 160 of FIGS. 1 and 25, or cradle 260 described below) attached to the handle assembly at or near the grip area 725. Further for example, the mower 702 could incorporate a sensor or switch like the sensors or switches 140 (see 140a, 140b in FIG. 3) to detect handle assembly position. Accordingly, aspects of the various embodiments may be combined as desired to produce additional embodiments not specifically described herein.

Training

In order to operate autonomously, the mower 100 must first know the boundaries of the work region. While various boundary detection systems are known, mowers in accordance with embodiments of the present disclosure may determine the bounds of the work region by initially undergoing a training procedure or phase as described in more detail below. After training, the mower 100 may operate autonomously within the work region. During the training phase, the mower is configured in the manual mode (the handle assembly is in the manual mode position). For simplicity, the mower referred to herein in the following paragraphs is the mower 100 described above. However, the mowers 110 and 700 could be substituted without limitation.

Figure 25:
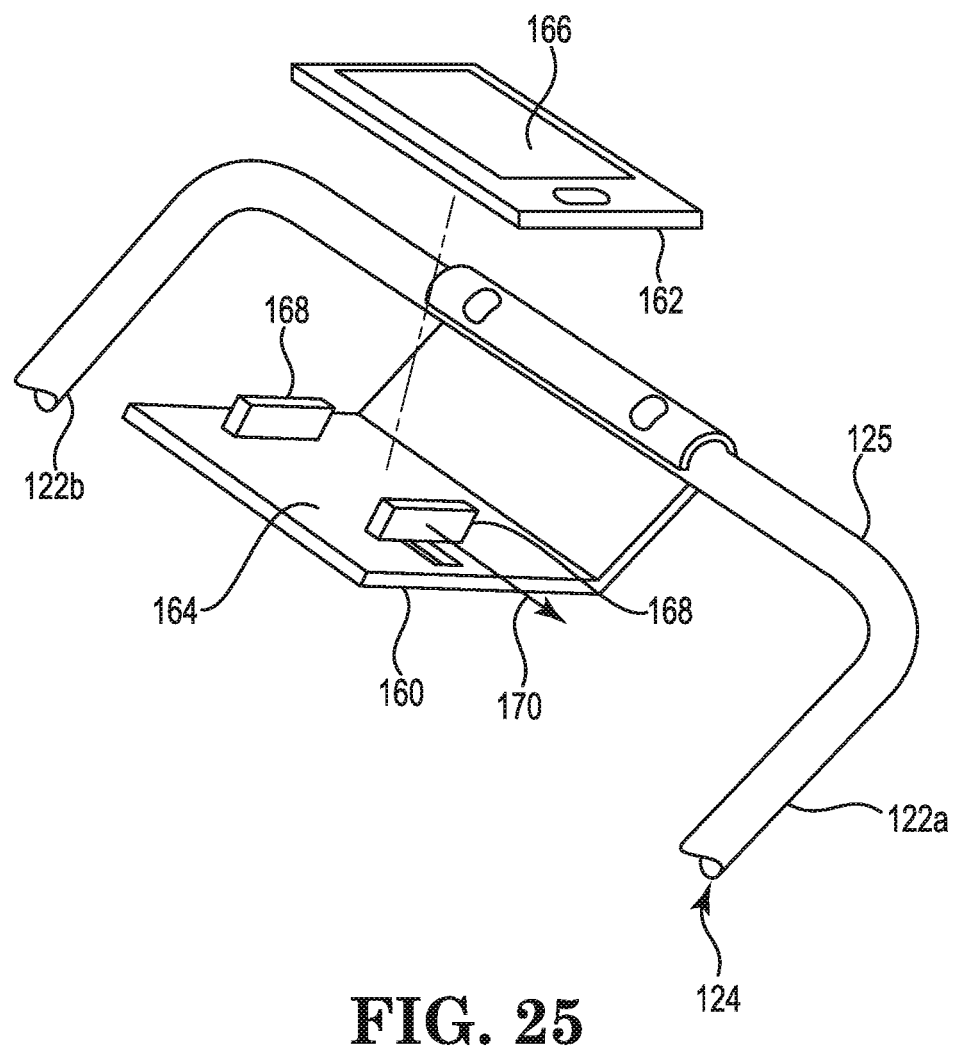
FIG. 25 is a perspective view of a cradle attached to and supported by a mower handle assembly in accordance with embodiments of the present disclosure.

As stated above, the handle assembly 124 may include the cradle 160, an example of which is shown in more detail in FIG. 25. The cradle 160 may receive therein a mobile computer 162 (e.g., smartphone) that supports a communication protocol (wired or wireless) compatible with the radio 141 of the mower 100 (see FIG. 3). For example, the mobile computer 162 may support short-range wireless communication via the Bluetooth wireless protocol. The controller 142 may communicate with the mobile computer 162 (e.g., during, among other times, the training phase) to present various controls and operator feedback during the training phase of the mower as further described below.

The cradle 160 may include various features that assist in holding the mobile computer 162 during the training phase. For example, the cradle may include an angled surface 164 that supports the mobile computer such that a display 166 is inclined at an angle (the angle in some embodiments being adjustable to accommodate the viewing preferences of the operator) that provides adequate visibility to an operator standing or walking behind the mower. Moreover, the cradle 160 may include retention features that hold the mobile computer during movement of the mower. For example, the cradle may include two opposed surfaces 168, wherein one or both of the surfaces is spring-loaded toward the other. To place the mobile computer 162 into the cradle, the operator may first displace the surface 168 away from the opposing surface 168 (e.g., in the direction 170). The mobile computer 162 may then be located between the surfaces 168 and the biased surface 168 released, wherein it contacts the mobile computer and biases it against the opposing surface 168.

Figure 26:
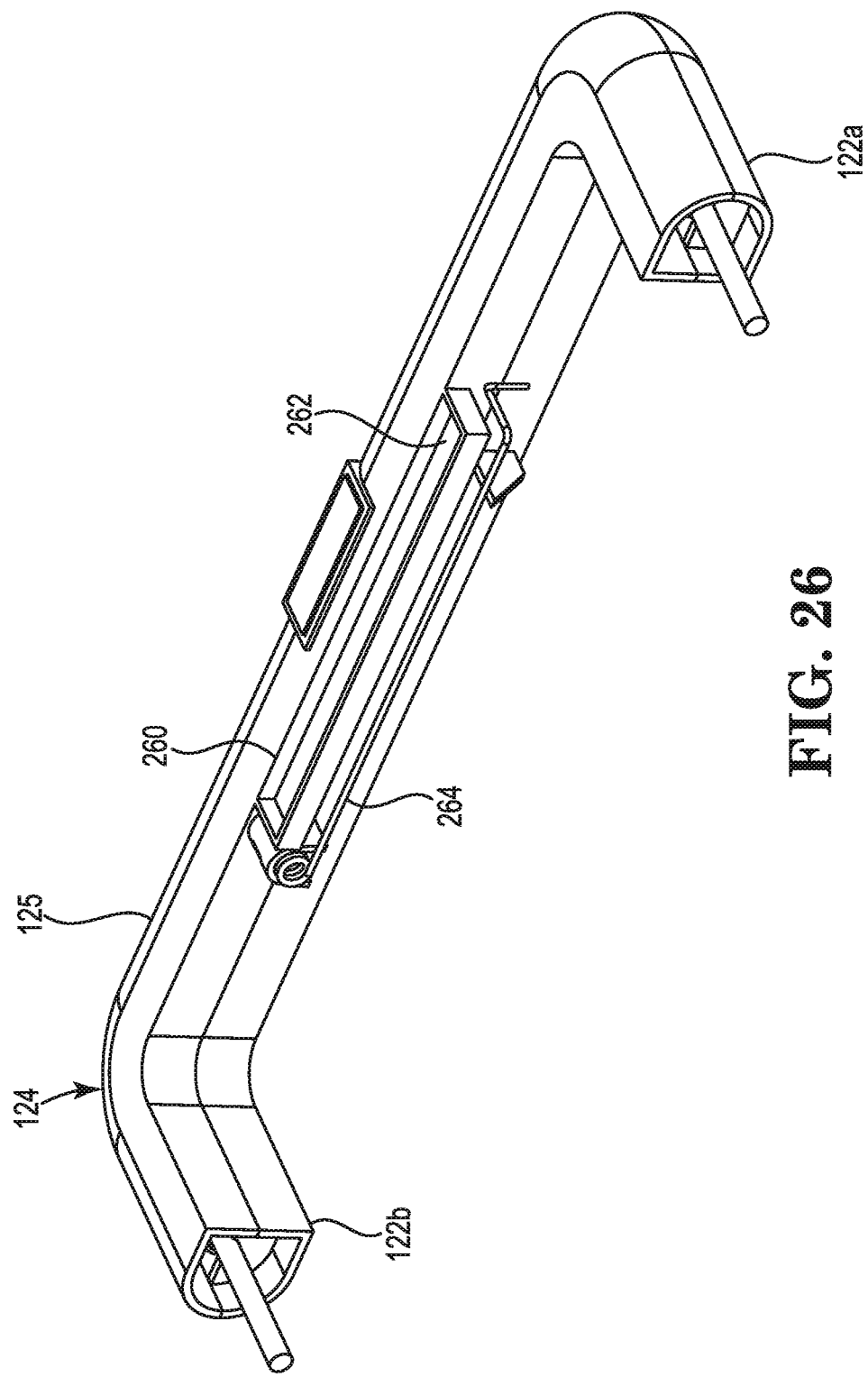
FIG. 26 is a perspective view of a cradle attached to and supported by a mower handle assembly in accordance with another embodiment of the present disclosure.

Other embodiments may utilize most any other retention device that is capable of securing the mobile computer during movement of the mower 100. For example, FIGS. 26 and 27 illustrate an embodiment of another cradle 260 attached near the grip area 125 of a handle assembly 124. The cradle 260 includes a slot 262 that receives the mobile computer 162 therein as shown in FIG. 27. A retention mechanism configured as a spring-loaded arm (e.g., a torsion spring 264) may be attached to the cradle as shown in FIG. 26. The spring 264 may be deflected to permit mobile computer insertion into the slot 262. Once the mobile computer is seated in the slot 262, however, the spring 264 is released, after which it abuts an edge of the mobile computer as shown. The spring thus holds the mobile computer 162 in place against the slot as shown in FIG. 27.

To enter the training phase, the handle assembly 124 may (if not already in position) first be deployed or moved from the first or autonomous mode position to the second or manual mode position. After the handle assembly is in place, the mobile computer 162 may be placed in or on the cradle 160 as described above. The operator may then initiate communication between the mobile computer 162 and the controller 142 (see FIG. 3). This initiation may involve pairing or otherwise connecting the mobile computer 162 to the mower 100 (e.g., to the controller 142) so that the two devices may wirelessly communicate with one another. While described herein as wireless communication (e.g., Bluetooth), alternate embodiments could again provide a wired interconnection. The operator may then launch application-specific software on the mobile computer that presents status information 167 to the operator during the training phase. The software may further permit the operator to issue commands during the training process via inputs provided by virtual buttons 169 that appear on the display 166 (see FIG. 27). For example, the application may allow the operator to, among others, issue commands and receive instructions directed to: entering the training phase; starting/stopping recording of data related to the traversal of a boundary of a work region, an exclusion zone, or a transit path; and when to push the mower along an identified boundary or path.

When the operator is ready to initiate the training phase, the mower may be pushed, using the handle assembly 124, to a perimeter of the work region (or to a perimeter of an exclusion zone). At this point, training may begin by selecting the appropriate training phase (e.g., a boundary training phase for the work region or an exclusion zone, or a transit path training phase) via interaction with the mobile computer (e.g., the display 166). In the case of the boundary training phase, the operator may then commence to traverse the boundary of the work region.

During the boundary training phase, the mower 100 may record or otherwise collect data associated with the boundary as the mower traverses the boundary. The mower 100 may further (via the application software running on the mobile computer 162) present various status information (see, e.g., 167 in FIG. 27) of the training phase to the operator during traversal/training. For instance, the display 166 may plot, in real-time, zone coordinates of the mower during perimeter recording. In addition, the display 166 may present instructions requesting that the operator change (e.g., reduce) mower speed. Maintaining mower speed below a threshold during training may be important, especially for vision-based systems, to ensure that the mower is able to capture sufficient data.

Such speed-related instructions/feedback may be presented textually or graphically to the operator. For example, feedback and/or other status information may be presented as a quantitative speed indicator (e.g., speedometer), or a speed-related icon or object (e.g., an icon that changes color: green for acceptable speed, yellow or red for unacceptable speed). In other embodiments, the display 166 could indicate whether a change in speed is needed by showing a speedometer reading alongside a desired target speed or showing "up" or "down" arrows to indicate a faster or slower speed is recommended. In yet other embodiments, the display could provide a simplistic "pass/fail" indicator or provide audible indicators (via the mobile computer 162 or the mower/controller) during or after the training phase.

Figure 28:
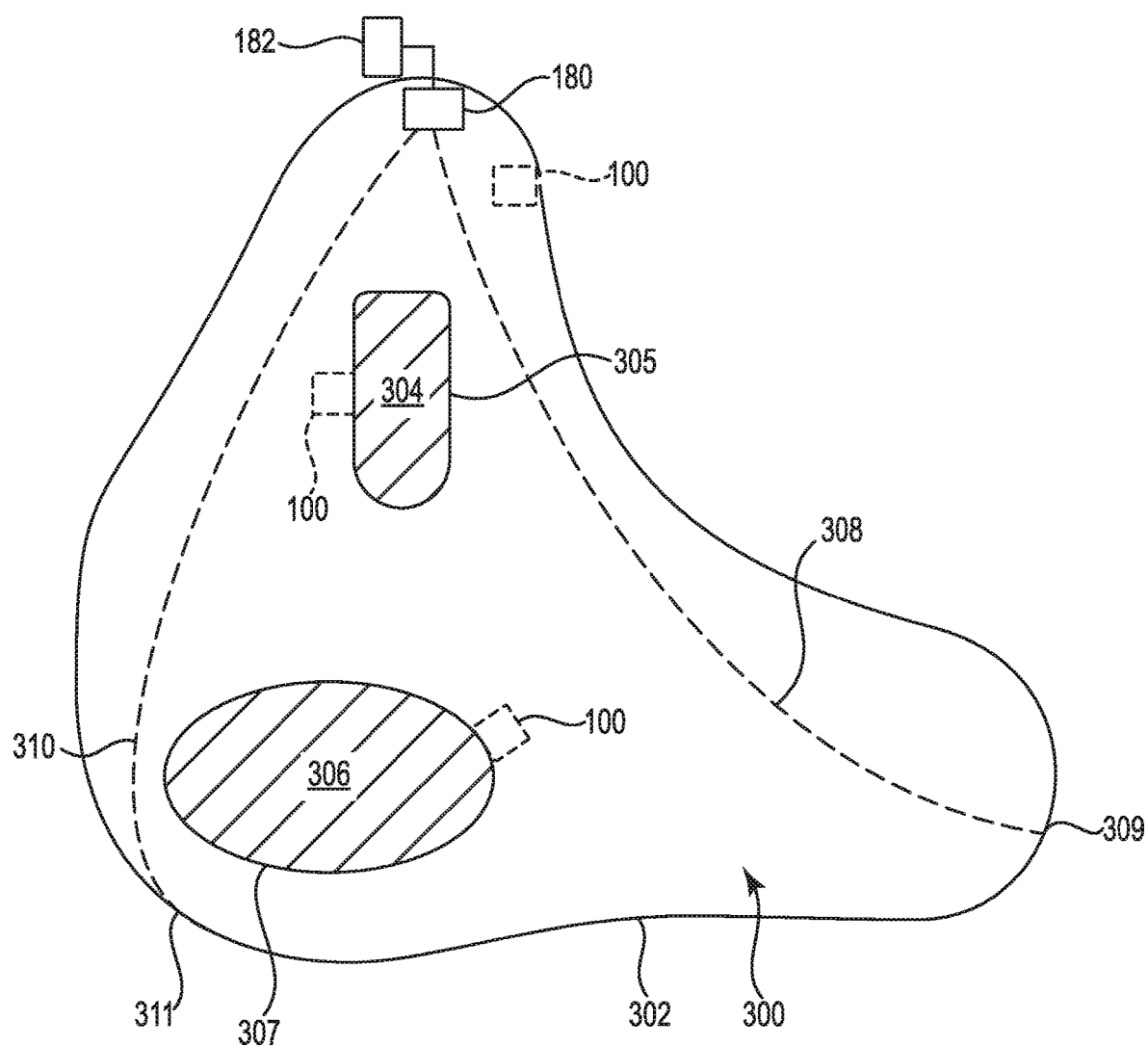
FIG. 28 is a schematic view of an exemplary work region (e.g., yard) having two exclusion zones or areas.

FIG. 28 is a diagrammatic representation of an exemplary yard or work region 300 defined by a perimeter or boundary 302. Within the work region 300 are two exclusion zones 304, 306 (e.g., landscaped gardens) also defined by boundaries 305, 307, respectively. As stated above, exclusion zones are areas within a work region that the mower 100 is not intended to mow. In some instances, the mower may cross through an exclusion zone (e.g., a transit path as described below), but the mower does not typically power its cutting blade assembly during such crossing.

A base station 180 is also provided and connected to a source of electrical power (e.g., a household alternating current outlet 182). The base station 180 provides a storage location for the mower when not operating, and further includes self-engaging electrical connections to permit the mower to autonomously return to the base station 180 and recharge its battery 133 (see FIG. 3) when needed.

Figure 29:
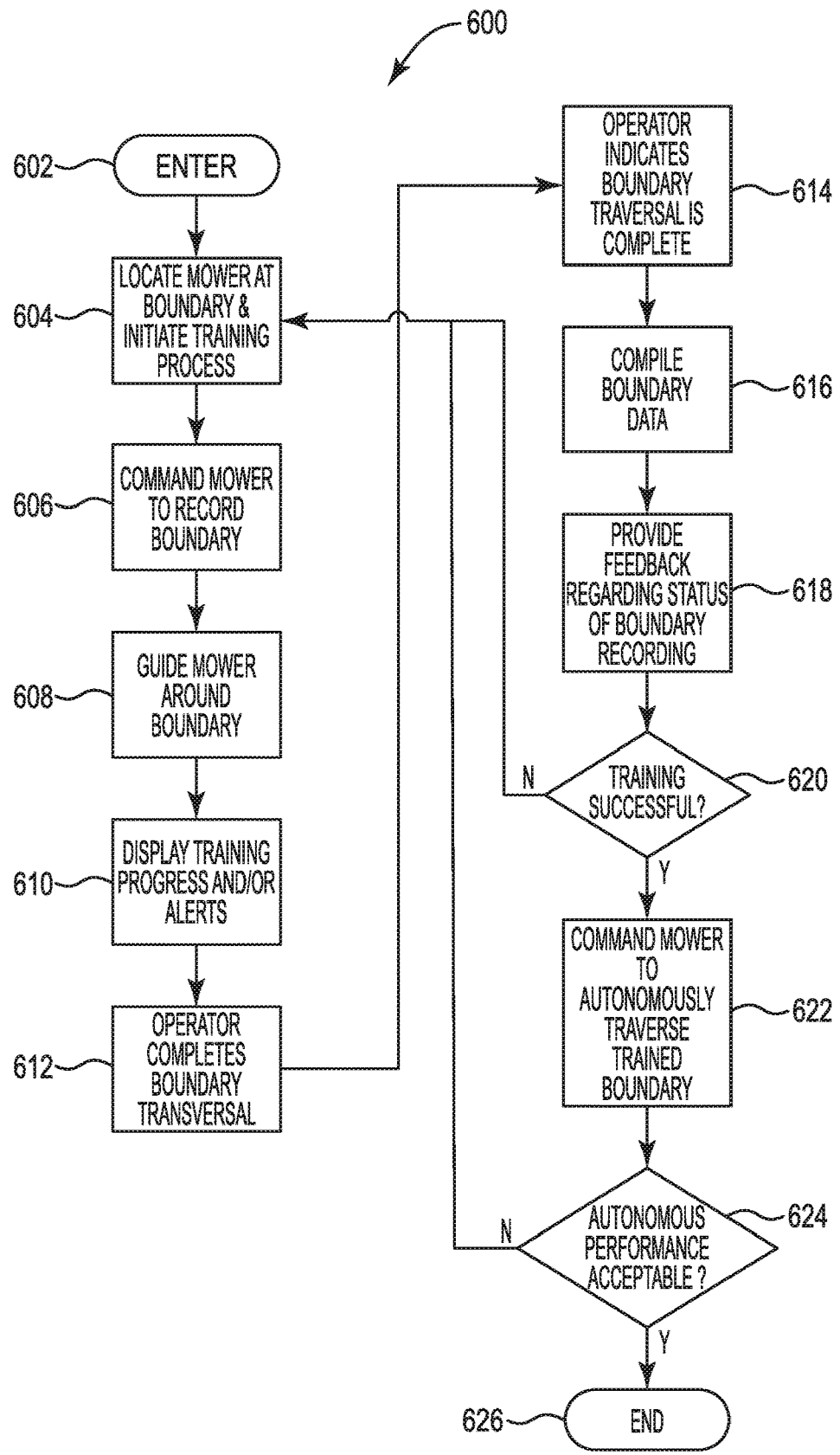
FIG. 29 is a flow chart of a boundary training method in accordance with embodiments of the present disclosure.

FIG. 29 illustrates an exemplary process 600 for training the mower (e.g., 100, 110, 700) with regard to boundaries. It is noted that this process describes only an exemplary boundary training method. It is understood that other operations may need to occur before or after the process 600 in order to permit autonomous operation of the mower. However, these other operations are not specifically addressed herein. In practice, the operator would first train the boundary 302 of the work region 300, and then proceed to train exclusion zones and transit paths. The process 600 assumes that the mower 100 is positioned at or near a boundary of the work region 300 (e.g., to train the boundary 302 as indicated by the mower 100 in FIG. 28), or at or near a boundary of one of the exclusion zones 304, 306 (e.g., to train the boundary 305, 307). Although the process of FIG. 29 is described below in the context of training the boundary 302 of the work region 300, the process would apply, with slight variation, to the boundaries 305 and 307, and to transit paths as well. Moreover, while described in the context of mower 100, any mower (e.g., mower 110 or 700 described herein) may be used without departing from the scope of this disclosure.

The process 600 is entered at 602. Once the mower 100 is located along the boundary 302 (see mower 100 adjacent boundary 302 FIG. 28), the training process or phase may be initiated at 604. Initiating the training process may include deploying the handle (e.g., moving the handle to the manual mode position as described herein), locating the mobile computer 162 in the cradle (see, e.g., cradle 260 in FIG. 27) and interacting with the software running on the mobile computer 162. Once the training process is initiated, the operator may select whether the boundary to be trained is a work region boundary (e.g., 302 in FIG. 28), an exclusion zone boundary (e.g., boundary 307), or a transit path.

The operator may command the mower (again, via interaction with the display 166 of the mobile computer 162) to record data associated with the boundary ("boundary data") as the mower traverses the boundary at 606. Once recording is initiated, the mower may utilize a variety of sensors (e.g., GPS, wheel encoders, vision systems, lidar, radar, etc.) to record its travel path as the mower 100 is manually guided or pushed around the boundary 302 (see FIG. 28) as indicated at 608 in FIG. 29. In some embodiments, the mower may provide an assistive torque to the rear wheels 106 (see FIG. 3) to assist the operator as the mower is guided around the boundary 302. Moreover, the cutting blade assembly 120

(see FIG. 3) could be either active or inactive during the training phase. Activating the cutting blade assembly 120 during the training phase could provide feedback as to the actual cutting path the mower will make as it is guided about the boundary. If cutting blade assembly 120 actuation is allowed, it may be controlled by an option presented on the display 166 (see FIG. 27) during training. Such cutting operation may necessitate the use of operator presence controls (e.g., on the handle itself or on the display 166 of the mobile computer 162).

Because a cutting width 192 of the mower 100 is narrower than the housing 102 width (see, e.g., FIG. 3), the top of the housing 102 may include visual markings 190 (shown in FIG. 9 only) that indicate to the operator the cutting width of the mower (e.g., the markings aligning with the transverse cutting width 192 (see FIG. 3) of the cutting blade assembly 120). Such markings may be useful to the operator when the blade assembly 120 is unpowered during the training phase.

During traversal of the boundary, the mower 100 (via the display 166) may optionally indicate/display to the operator status and/or training alerts at 610. For example, the controller 144 may graphically or audibly recommend slowing ground speed to improve data capture.

Once the operator (mower) has completed traversal of the boundary 302 (e.g., moved slightly beyond the original starting point) at 612, the operator may indicate (e.g., via the mobile computer) that boundary traversal is complete at 614. The controller 142 and/or the computer 162 (or other remote computer) may then compile the boundary data collected to ultimately generate a mapped boundary path of the work region (or exclusion zone, transit path) based upon the boundary data at 616.

The mower may provide (via an onboard display or via the mobile computer 162) feedback regarding status of the training process (e.g., status of boundary recording) at 618. For example, at completion, the mower 100 may provide an indication on the mobile computer that the boundary training was successful (e.g., the data/mapped boundary path satisfies predetermined path criteria) by displaying a status such as a simple "pass/fail" indication at 620. Path criteria that may affect training success includes determining whether the mapped boundary path defines a bounded area (e.g., forms an enclosed or bounded area or shape). Other path criteria may include determining whether bottlenecks are present. A bottleneck may exist, for example, when a mapped boundary path of the work region is within a threshold distance of an object or another mapped boundary path (e.g., the boundary 302 is too close—such that a path width is insufficient for the mower to easily pass—to another boundary path (boundary 305 or 307).

If the training process is successful at 620, the operator may remove the mobile computer from the cradle, move the handle assembly to the first or autonomous mode position, and command or instruct the mower 100 to traverse the trained boundary of the work region 300 (or exclusion zone or transit path) autonomously at 622. Assuming the operator concludes that the trained path is acceptable at 624, the process ends at 626. If, on the other hand, it is determined that training was unsuccessful at 620, or the operator finds autonomous operation to be unacceptable at 624, the process may return to 604 and training (or a portion thereof) re-executed. The process 600 may then be repeated for each boundary (including exclusion zones) and transit path. In some embodiments, the software running on the mobile computer 162 may permit the operator to revise, add, and/or delete some or all of a boundary path or portion thereof during the process 600.

In addition to containment/exclusion zone training, the mower 100 may also be trained to utilize one or more "return-to-base" transit paths ("RTB transit paths") using the handle assembly 124 in the manual mode position. That is, the mower 100 may also be trained as to what path or paths it should use to return to the base station 180. Two such RTB transit paths are shown in FIG. 28 as paths 308 and 310. Path 308 is trained from a location 309, while path 310 is trained from a location 311. Training RTB transit paths may be useful to assist or expedite the mower's return to the base station to, for example, account for complex yards, or to otherwise allow the operator to constrain the mower's preferred return path. While only two paths 308, 310 are illustrated, any number of RTB transit paths may be trained. During autonomous operation, the mower 100 may guide itself to the nearest RTB transit path and then follow that path to the base station 180 when operation is complete or the mower battery needs re-charging. Of course, to permit RTB transit path training, the mower/controller may also permit the operator to establish or otherwise train a "home" location of the base station 180.

Referring once again to FIG. 28, before autonomous mowing may take place, the yard (work region 300) is mapped. Yard mapping involves defining the mowing area (e.g., work region boundary 302), defining all exclusion zones (e.g., boundaries 305, 307 of all exclusion zones), identifying the home position for the base station 180, and optionally identifying transit paths. In addition to RTB transit paths, transit paths may be used to define how the mower 100 gets from one portion of the work region 300 to another (or to an isolated second work region). For example, transit paths may be configured to direct the mower: to a particular mowing area; across an exclusion zone such as a sidewalk, patio, or driveway that bifurcates the work region; or through a gate of a fenced yard. The mower will generally not enter into an exclusion zone unless a transit path is trained through the exclusion zone. Moreover, the mower may not typically mow while moving along some of these transit paths.

Figure 30:
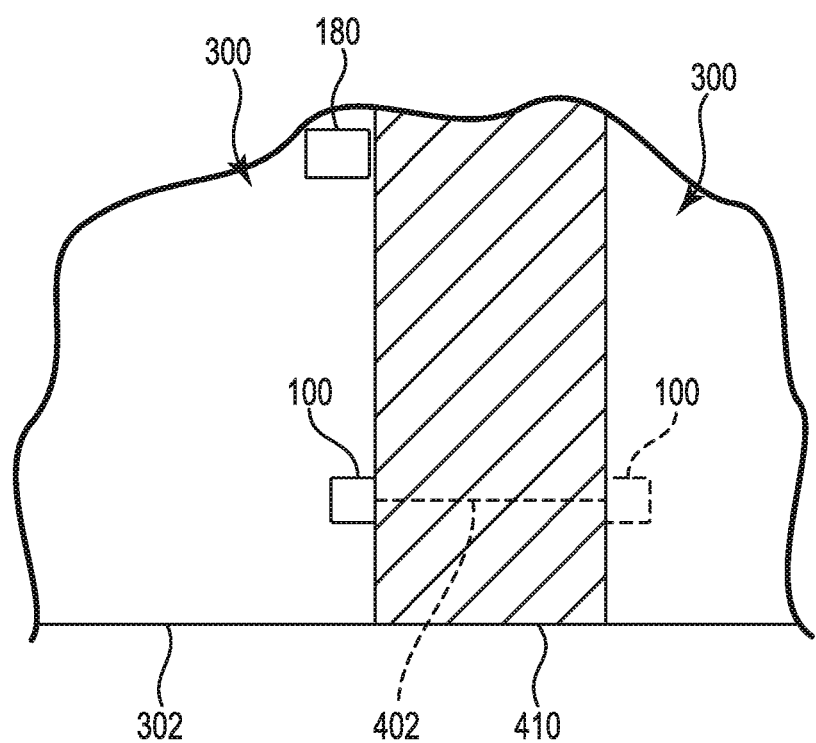
FIG. 30 is a schematic view of a transit path in accordance with embodiments of the present disclosure.

FIG. 30 illustrates an exemplary transit path 402 extending across an exclusion zone 410 (e.g., driveway). The mowing area (e.g., work region 300) may be located on each side of the driveway, but no mowing area connects these two sides. To train the transit path 402, the mower 100 (with the handle assembly 124 in the manual mode position) is first placed at the desired starting point (see solid line representation of mower 100 in FIG. 30). The training phase may then be initiated using the mobile computer. Once initiated, the mower 100 may be pushed along the desired transit path 402. Once the desired path is traversed (see broken line mower 100 in FIG. 30), the operator may end the training session and save the transit path. During autonomous mower operation, the mower 100 will only cross from one side of the driveway 410 to the other using the defined transit path 402. Multiple transit paths could be trained across any one exclusion zone.

Once all boundaries (including exclusion zones) and transit paths are taught, a map of the work region may be presented to the operator on the mobile computer so that the operator can confirm that all boundaries (including exclusion zones) and transit paths are properly accounted for. The operator may then confirm that the boundaries and transit zones are properly represented before autonomous mowing operation may begin. As stated above, in some embodiments the operator may be able to delete and/or modify boundaries and transit paths using the mobile computer during this review.

Storage

As illustrated in FIGS. 5, 8, and 11, the handle assembly 124 may protrude from the housing 102 when the handle assembly is in the autonomous mode position. Accordingly, the handle assembly (e.g., the grip area 125) may also function as a lifting point for the mower, or even as a hangar to permit the mower to be hung from a wall hook 500 (see FIG. 31) during off-season storage. That is, the mower 100 (and optionally the base station 180 as described below) may be stored, e.g., on a wall 502, with the housing 102 in a generally vertical orientation during storage using the handle assembly 124.

Figure 31:
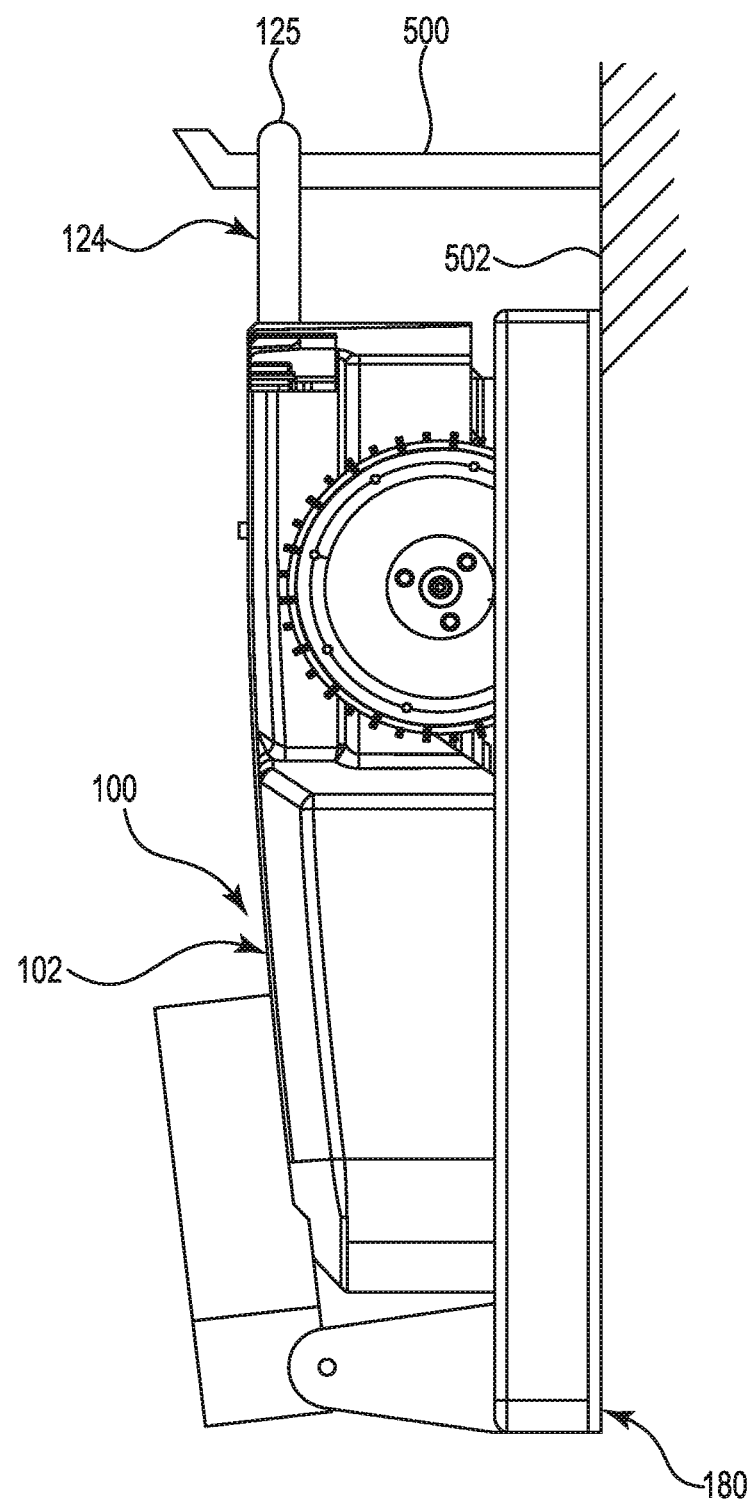
FIG. 31 is a side elevation view of a mower and base station stored in a vertical orientation with a wall hook in accordance with embodiments of the present disclosure.

For instance, the mower 100 could first be placed into its charging base station 180 as shown in FIG. 31. During periods of inactivity between (e.g., between mowing sessions), the base station 180 is adapted to receive the mower 100 when the base station and mower are in a horizontal orientation. While the mower may dock with, and undock from, the base station autonomously as needed during normal operation, it may also positively secure in place relative to the base station 180 (e.g., via a manual latch (not shown) or the like) to form a unitary storage assembly for off-season storage. Some part of the storage assembly (e.g., a part of the mower and/or the base station) may form a hanging structure that permits the mower and the base station together (the storage assembly), when in a vertical orientation, to be hung from the wall 502 for storage. For example, in some embodiments, the storage assembly (mower 100 and base station 180) could be hung in the vertical orientation by the handle assembly 124 as shown in FIG. 31.

Figure 33:
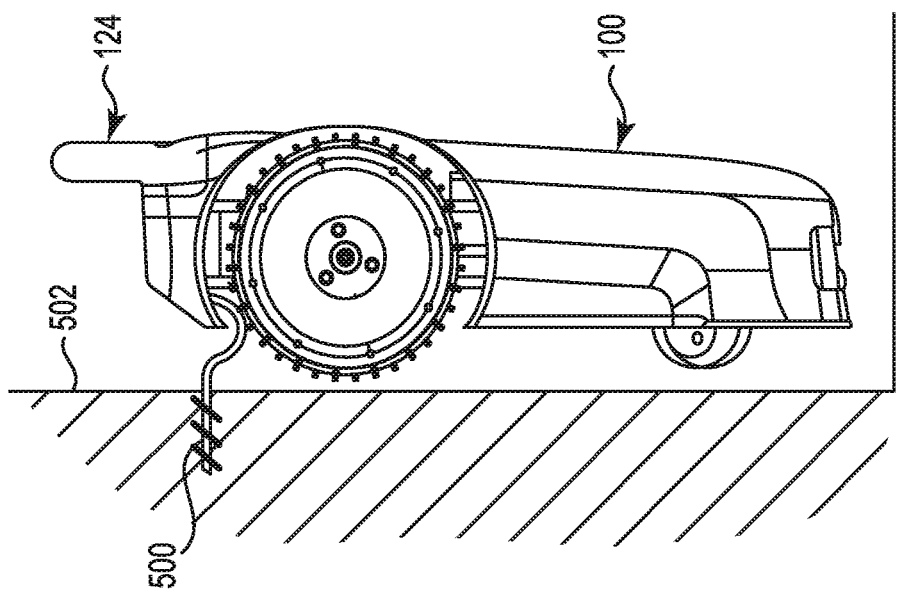
FIG. 33 illustrates a mower being stored in a vertically orientation with a wall hook.
Figure 32:
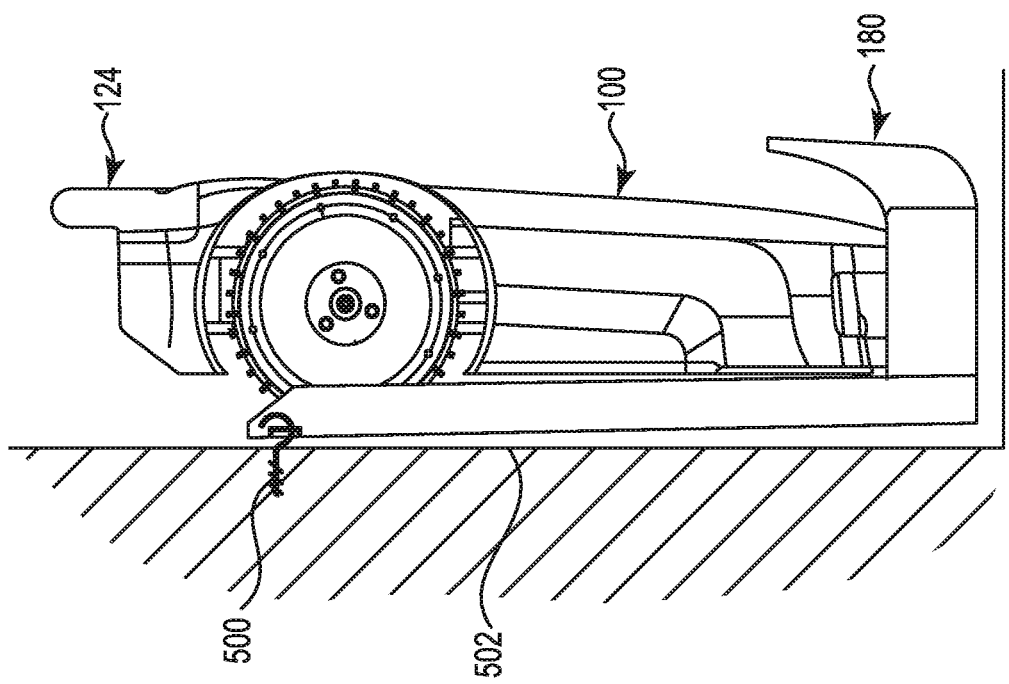
FIG. 32 is an alternative embodiment of a mower and base station stored in a vertical orientation with a wall hook.

FIG. 32 illustrates another example of storing the mower 100 and base station 180 together in a vertical orientation on a wall 502 using a wall hook 500. In this embodiment, the hook 500 engages a feature (e.g., aperture; see apertures 382 in FIG. 34) formed in the base station 180 as shown instead of the mower 100 or mower handle assembly 124. FIG. 33 illustrates a hook 500 that may be used to store only the mower 100 (and not the base station) on the wall 502. The wall hook 500 may engage a feature (e.g., housing) of the mower to support it in the vertical orientation.

Figure 35:
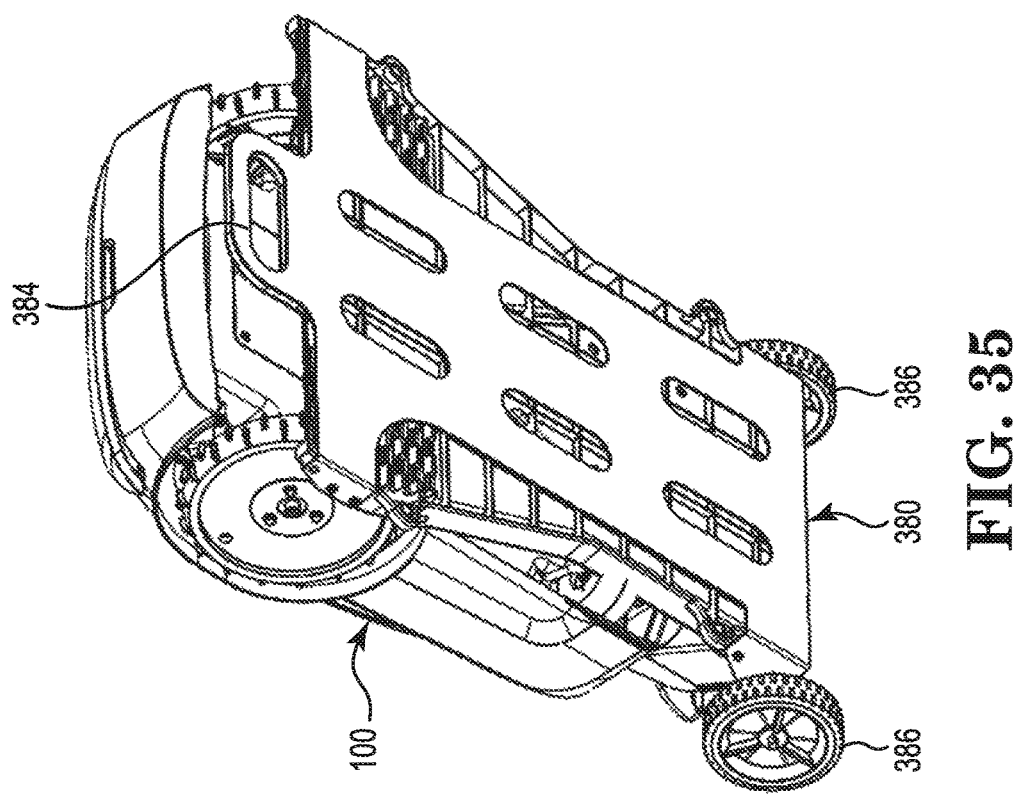
FIG. 35 is a tilted perspective view of the embodiment of FIG. 34 illustrating transport of the mower and base station.
Figure 34:
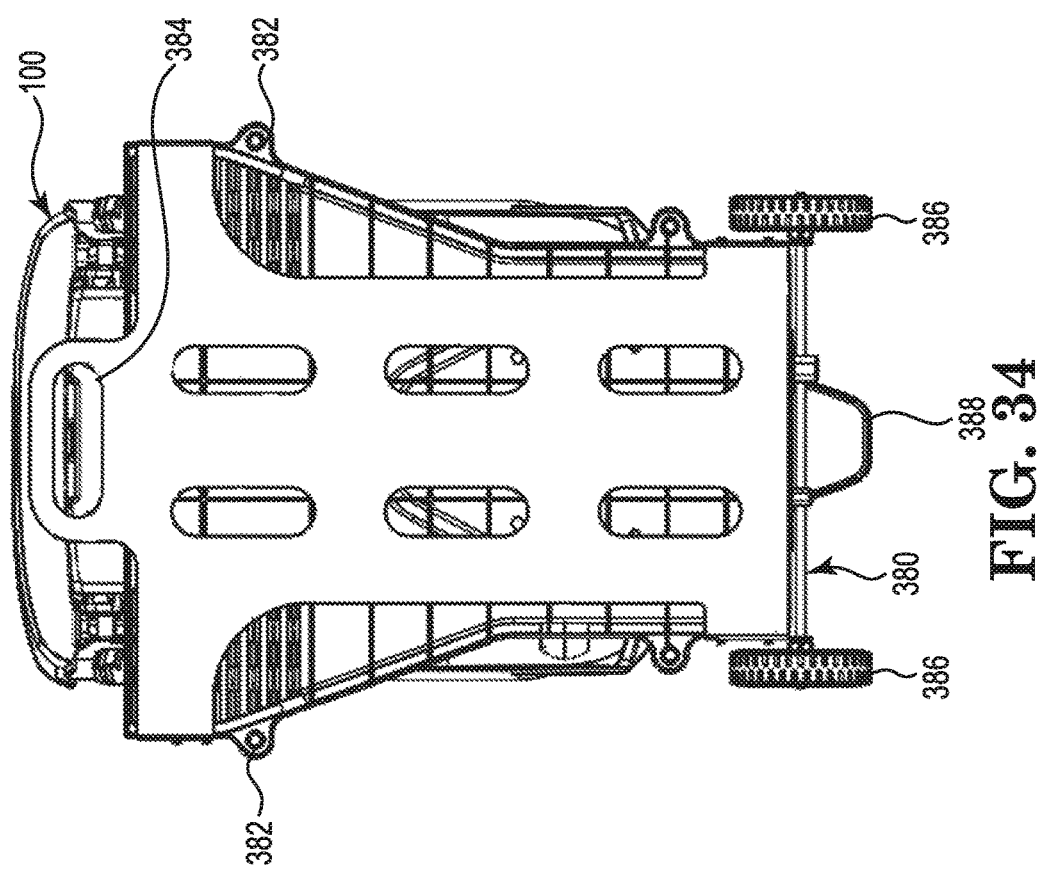
FIG. 34 is a rear elevation view of yet another embodiment of a mower and base station as configured for storage in a vertical orientation.

FIGS. 34 and 35 illustrate yet another embodiment of the mower 100 and a base station 380 configured for storage in a vertical orientation. Like the base stations described above, the base station 380 may be hung from a wall e.g., using the hooks 500 (see FIG. 32) engaging apertures 382. However, unlike the base station 180, the base station 380 may include: a handle 384; one or more wheels 386; and a foot 388. Once the mower is placed within the base station 380, it may be secured therein, e.g., with latches (not shown) or the like. Once the mower is secured, the base station (with mower in place) may be rotated until it sits vertically on wheels 386 and the foot 388. Accordingly, the mower 100 and base station 380 may be stored in a vertical orientation either upon a floor or on the wall. Moreover, the base station 380 can be tilted from vertical as shown in FIG. 35 so that the wheels 386 permit rolling transport of the storage assembly (base station and mower) by gripping the handle 384.

While numerous features/elements are described herein in the context of particular embodiments, various combinations of features/elements from these different embodiments are within the scope of this disclosure. Such combinations may be included in, for example, the embodiments identified below.

Embodiment 1. An autonomous vehicle comprising: a housing comprising a working member; and a handle assembly connected to the housing, wherein the handle assembly is movable between a manual mode position in which the handle assembly extends outwardly from the housing, and an autonomous mode position. The handle assembly comprises a first handle element and a second handle element, wherein when the handle assembly is in the autonomous mode position, the first handle element is telescopically received within the second handle element and the second handle element is telescopically received within the housing.

Embodiment 2. The vehicle according to Embodiment 1, wherein the handle assembly further pivots, relative to the housing, as it moves between the manual mode position and the autonomous mode position.

Embodiment 3. The vehicle according to any one of Embodiments 1-2, wherein the handle assembly further comprises: a grip area spaced apart from the housing when the handle assembly is in the manual mode position; and an actuator connected to the grip area.

Embodiment 4. The vehicle of Embodiment 3, wherein the actuator is adapted to selectively move, relative to the grip area, between a neutral position and an actuated position, and wherein movement of the actuator from the neutral position to the actuated position permits the first handle element to be telescopically received within the second handle element and the second handle element to be telescopically received within the housing.

Embodiment 5. The vehicle according to Embodiment 3, wherein the first and second handle elements define a handle tube assembly, and wherein the actuator is adapted to displace a rod contained within the handle tube assembly.

Embodiment 6. The vehicle according to Embodiment 5, further comprising a pin lock assembly associated with the first handle element, wherein the pin lock assembly is adapted to lock the first handle element relative to the second handle element when the handle assembly is in the manual mode position.

Embodiment 7. The vehicle according to Embodiment 5, further comprising a pin lock assembly associated with the second handle element, wherein the pin lock assembly is adapted to lock the second handle element relative to the housing when the handle assembly is in the manual mode position.

Embodiment 8. The vehicle according to any one of Embodiments 6-7, wherein the pin lock assembly is further adapted to lock the handle assembly at a predetermined angular orientation relative to the housing when the handle assembly is in the manual mode position.

Embodiment 9. The vehicle according to any one of Embodiments 1-8, wherein the second handle element further comprises a first pin and a second pin, wherein the first and second pins abut corresponding surfaces in the housing when the handle assembly is in the manual mode position.

Embodiment 10. The vehicle according to Embodiment 9, wherein the second pin defines a pivot axis about which the handle assembly pivots when moving between the autonomous mode and manual mode positions.

Embodiment 11. The vehicle according to any one of Embodiments 1-10, wherein the housing defines a channel adapted to telescopically receive the second handle element when the handle assembly is in the autonomous mode position.

Embodiment 12. The vehicle according to any one of Embodiments 1-11, wherein the handle assembly further comprises a grip area, and wherein a cradle is attached to the handle assembly at or near the grip area.

Embodiment 13. An autonomous mower comprising: a housing; a cutting blade assembly carried by the housing; a handle assembly connected to the housing, the handle assembly moveable between an autonomous mode position and a manual mode position; a sensor adapted to both: detect when the handle assembly is moved away from the autonomous mode position; and generate a signal representative thereof; and an electronic controller associated with the housing, wherein the controller, upon receipt of the signal, automatically disables an autonomous mode of operation of the mower.

Embodiment 14. The mower according to Embodiment 13, further comprising a cradle attached to the handle assembly, the cradle adapted to hold a mobile computer in an orientation visible to an operator standing or walking behind the housing when the handle assembly is in the manual mode position.

Embodiment 15. The mower according to Embodiment 14, wherein the controller is adapted to communicate with the mobile computer during a training phase of the mower.

Embodiment 16. A method of training an autonomous vehicle to operate within a work region, the method comprising: deploying a handle assembly connected to a housing of the vehicle from a first position to a second position; placing a mobile computer on a cradle attached to the handle assembly; initiating communication between the mobile computer and an electronic controller associated with the vehicle; selecting a boundary training phase of the vehicle via interaction with the mobile computer; traversing a boundary of the work region; collecting data associated with the boundary as the vehicle traverses the boundary of the work region; generating, with the controller, the mobile computer, or a remote computer a mapped boundary path based upon the data associated with the boundary; and indicating, on the mobile computer, whether the mapped boundary path satisfies path criteria.

Embodiment 17. The method according to Embodiment 15, further comprising displaying a status of the boundary training phase on the mobile computer during traversal of the boundary of the work region.

Embodiment 18. The method according to any one of Embodiments 16-17, wherein the path criteria comprises one or more of: determining whether the mapped boundary path defines a bounded area; and determining whether the mapped boundary path is within a threshold distance of another boundary path.

Embodiment 19. The method according to any one of Embodiments 16-18, further comprising: returning the handle assembly to the first position; and instructing the vehicle to traverse the boundary of the work region autonomously.

Embodiment 20. A mower system comprising: a mower; and a base station adapted to receive the mower when the mower is in a horizontal orientation during periods of inactivity of the mower, wherein the mower and base station are adapted to be secured to one another to form a storage assembly.

Embodiment 21. The mower system of Embodiment 21, wherein the storage assembly comprises a hanging structure that permits the mower and base station together to be hung in a vertical orientation for storage.

Embodiment 22. The mower system of Embodiment 21, wherein the hanging structure comprises a handle of the mower or an aperture formed in the base station.

Embodiment 23. The mower of any one of Embodiments 20-22, wherein the base station comprises one or more wheels adapted to permit rolling transport of the storage assembly.

The complete disclosures of the patents, patent documents, and publications cited herein are incorporated by reference in their entirety as if each were individually incorporated. In the event that any inconsistency exists between the disclosure of the present application and the disclosure(s) of any document incorporated herein by reference, the disclosure of the present application shall govern.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. An autonomous vehicle comprising:
a housing comprising a working member; and
a handle assembly connected to the housing, wherein the handle assembly is movable between a manual mode position in which the handle assembly extends outwardly from the housing, and an autonomous mode position, the handle assembly comprising a first handle element and a second handle element, wherein when the handle assembly is in the autonomous mode position, the first handle element is telescopically received within the second handle element and the second handle element is telescopically received within the housing, the housing defining a handle channel adapted to telescopically receive the second handle element when the handle assembly is in the autonomous mode position, and wherein the handle assembly pivots from the manual mode position to an intermediate position, after which the handle assembly is telescopically received into the handle channel to the autonomous mode position.

2. The vehicle according to claim 1, wherein the handle assembly further comprises:
a grip area spaced apart from the housing when the handle assembly is in the manual mode position; and
an actuator connected to the grip area, wherein the actuator is adapted to selectively move, relative to the grip area, between a neutral position and an actuated position, and wherein movement of the actuator from the neutral position to the actuated position permits the first handle element to be telescopically received within the second handle element and the second handle element to be telescopically received within the housing.

3. The vehicle according to claim 2, wherein the first and second handle elements define a handle tube assembly, and wherein the actuator is adapted to displace a rod contained within the handle tube assembly.

4. The vehicle according to claim 3, further comprising a pin lock assembly associated with the first handle element, wherein the pin lock assembly is adapted to lock the first handle element relative to the second handle element when the handle assembly is in the manual mode position.

5. The vehicle according to claim 3, further comprising a pin lock assembly associated with the second handle element, wherein the pin lock assembly is adapted to lock the second handle element relative to the housing when the handle assembly is in the manual mode position.

6. The vehicle according to claim 5, wherein the pin lock assembly is further adapted to lock the handle assembly at a predetermined angular orientation relative to the housing when the handle assembly is in the manual mode position.

7. The vehicle according to claim 1, wherein the second handle element further comprises a first pin and a second pin, wherein the first and second pins abut corresponding surfaces in the housing when the handle assembly is in the manual mode position.

8. The vehicle according to claim 7, wherein the second pin defines a pivot axis about which the handle assembly pivots when moving between the autonomous mode and manual mode positions.

9. The vehicle according to claim 1, wherein the handle assembly further comprises a grip area, and wherein a cradle is attached to the handle assembly at or near the grip area.

10. An autonomous vehicle comprising:
a housing comprising a working member, wherein the housing defines a handle channel; and
a handle assembly connected to the housing, wherein the handle assembly is movable between a manual mode position in which the handle assembly extends outwardly from the housing, and an autonomous mode position, the handle assembly comprising:
a first handle element and a second handle element together forming a handle tube assembly;
a grip area spaced apart from the housing when the handle assembly is in the manual mode position; and
an actuator connected to the grip area, the actuator configured to displace a rod contained within the handle tube assembly;
wherein when the handle assembly is in the autonomous mode position, the first handle element is telescopically received within the second handle element and the second handle element is telescopically received within the handle channel of the housing, the handle assembly being configured to pivot from the manual mode position to an intermediate position, after which the handle assembly is telescopically received into the handle channel in the autonomous mode position;
and wherein the actuator is adapted to selectively move, relative to the grip area, between a neutral position and an actuated position, and wherein movement of the actuator from the neutral position to the actuated position permits the first handle element to be telescopically received within the second handle element and the second handle element to be telescopically received within the handle channel of the housing.

11. The vehicle according to claim 10, further comprising a pin lock assembly associated with the first handle element, wherein the pin lock assembly is adapted to lock the first handle element relative to the second handle element when the handle assembly is in the manual mode position.

12. The vehicle according to claim 10, further comprising a pin lock assembly associated with the second handle element, wherein the pin lock assembly is adapted to lock the second handle element relative to the housing when the handle assembly is in the manual mode position.

13. The vehicle according to claim 10, further comprising a cradle attached to the handle assembly at or near the grip area.

* * * * *